United States Patent
Zubrin et al.

(10) Patent No.: US 7,654,330 B2
(45) Date of Patent: Feb. 2, 2010

(54) APPARATUS, METHODS, AND SYSTEMS FOR EXTRACTING PETROLEUM USING A PORTABLE COAL REFORMER

(75) Inventors: Robert M. Zubrin, Indian Hills, CO (US); Mark H. Berggren, Golden, CO (US)

(73) Assignee: Pioneer Energy, Inc., Lakewood, CO (US)

( * ) Notice: Subject to any disclaimer, the term of this patent is extended or adjusted under 35 U.S.C. 154(b) by 275 days.

(21) Appl. No.: 11/751,011

(22) Filed: May 19, 2007

(65) Prior Publication Data

US 2008/0283249 A1 Nov. 20, 2008

(51) Int. Cl.
*E21B 43/40* (2006.01)
*E21B 43/34* (2006.01)
*E21B 43/00* (2006.01)

(52) U.S. Cl. ............... 166/369; 166/75.11; 166/257; 166/266; 166/267; 166/268; 166/263

(58) Field of Classification Search ............ 166/257, 166/266, 267, 268, 263, 369, 65.1, 75.11
See application file for complete search history.

(56) References Cited

U.S. PATENT DOCUMENTS

| | | | |
|---|---|---|---|
| 3,193,006 A | 7/1965 | Lewis | |
| 3,084,919 A | 11/1971 | Schlinger et al. | |
| 3,725,246 A | 4/1973 | Kmercak et al. | |
| 3,918,263 A | 11/1975 | Swingle | |
| 4,024,912 A | 5/1977 | Hamrick et al. | |
| 4,183,405 A | 1/1980 | Magnie | |
| 4,186,800 A | 2/1980 | Allen | |
| 2,623,596 A | 8/1980 | Goss et al. | |
| 4,241,790 A | 12/1980 | Magnie | |
| 4,250,230 A * | 2/1981 | Terry | 429/12 |
| 4,299,286 A | 11/1981 | Alston | |
| 4,372,386 A | 2/1983 | Rhoades et al. | |
| 4,444,257 A | 4/1984 | Stine | |
| 4,446,919 A | 5/1984 | Hitzman | |
| 4,508,064 A | 4/1985 | Watanabe | |
| 4,597,441 A | 7/1986 | Ware et al. | |
| 4,622,275 A | 11/1986 | Noguchi et al. | |
| 4,659,634 A | 4/1987 | Struthers | |
| 4,691,771 A | 9/1987 | Ware et al. | |
| 4,706,751 A | 11/1987 | Gondouin | |
| 5,033,940 A | 7/1991 | Baumann | |

(Continued)

*Primary Examiner*—Jennifer H Gay
*Assistant Examiner*—Brad Harcourt
(74) *Attorney, Agent, or Firm*—American Pioneer Ventures; Daniar Hussain

(57) ABSTRACT

Apparatus, methods, and systems for extracting oil or natural gas from a well using a portable coal reformer. In one example, the method may include reforming coal by reaction with water to generate driver gas (comprising carbon dioxide and hydrogen gas), and injecting the driver gas into the well. The driver gas reduces the viscosity and pressurizes the oil to help extract the oil from the oil well. The coal reforming operation may include combusting coal or other combustible material with ambient oxygen to release energy, and heating coal and water with the energy released to a temperature above that required for the coal reforming reaction to proceed, thereby reforming coal and water into driver gas. The driver gas may be purified by filtering out particles and sulfur before injecting into the well. A portion of the hydrogen gas may be separated from the driver gas and used to generate electrical power.

22 Claims, 8 Drawing Sheets

U.S. PATENT DOCUMENTS

| | | |
|---|---|---|
| 5,059,404 A * | 10/1991 | Mansour et al. ............. 423/201 |
| 5,079,103 A | 1/1992 | Schramm |
| 5,105,887 A | 4/1992 | Hewgill et al. |
| 5,145,003 A | 9/1992 | Duerksen |
| 5,590,518 A | 1/1997 | Janes |
| 5,674,053 A | 10/1997 | Paul et al. |
| 5,687,559 A | 11/1997 | Sato |
| 5,755,089 A | 5/1998 | Vanselow |
| 5,769,610 A | 6/1998 | Paul et al. |
| 3,051,235 A | 1/2000 | Gregoli et al. |
| 3,327,782 A | 1/2000 | Gregoli et al. |
| 4,141,417 A | 1/2000 | Gregoli et al. |
| 6,016,867 A | 1/2000 | Gregoli et al. |
| 6,016,868 A | 1/2000 | Gregoli et al. |
| 6,306,917 B1 | 10/2001 | Bohn et al. |
| 6,328,104 B1 | 12/2001 | Graue |
| 6,431,840 B1 | 8/2002 | Mashimo et al. |
| 6,458,478 B1 | 10/2002 | Wang et al. |
| 6,503,649 B1 | 1/2003 | Czajkowski et al. |
| 6,653,005 B1 | 11/2003 | Muradov |
| 6,821,501 B2 | 11/2004 | Matzakos et al. |
| 6,893,755 B2 | 5/2005 | Leboe |
| 7,056,482 B2 | 6/2006 | Hakka et al. |
| 7,067,456 B2 | 6/2006 | Fan et al. |
| 7,089,907 B2 | 8/2006 | Shinagawa et al. |
| 7,100,692 B2 | 9/2006 | Parsley et al. |
| 2003/0070808 A1 * | 4/2003 | Allison ....................... 166/265 |
| 2004/0163311 A1 | 8/2004 | Ahmed et al. |
| 2007/0099038 A1 * | 5/2007 | Galloway .................... 429/17 |
| 2007/0130957 A1 * | 6/2007 | Hoffmann et al. ............. 60/780 |

* cited by examiner

APPARATUS, METHODS, AND SYSTEMS FOR EXTRACTING PETROLEUM USING A PORTABLE COAL REFORMER

REFERENCE TO RELATED APPLICATIONS

This application claims priority from co-pending U.S. application Ser. No. 11/392,898 entitled "Apparatus and method for extracting petroleum from underground sites using reformed gases" to Robert Zubrin et al., filed on Mar. 29, 2006, the entirety of which is hereby incorporated by reference herein. This application also claims priority from co-pending PCT Application No. PCT/US07/64664 entitled "Apparatus, methods, and systems for extracting petroleum and natural gas" to Robert Zubrin et al., filed on Mar. 22, 2007, the entirety of which is hereby incorporated by reference herein. This application is related to co-pending U.S. application Ser. No. 11/751,028 entitled "Portable and modular system for extracting petroleum and generating power" to Robert Zubrin et al., filed on May 20, 2007, the entirety of which is hereby incorporated by reference herein.

FIELD OF THE INVENTION

This invention relates to the extraction of gasses and liquids from underground and underwater sites and more particularly to petroleum and/or natural gas extraction using gas reformed from coal. More particularly, the present invention relates to a portable coal-reforming apparatus that may be taken to the location of a candidate oil field and used to extract oil and/or natural gas.

BACKGROUND OF THE INVENTION

Currently there are tens of thousands of depleted oil and natural gas wells around the world, which collectively possess significant amounts of petroleum resources that cannot currently be extracted using conventional extraction techniques.

For example, in a typical oil well, only about 30% of the underground oil is recovered during initial drilling ("primary recovery"). An additional approximately 20% may be accessed by "secondary recovery" techniques such as water flooding. In recent years, "tertiary recovery" (also known as "Enhanced Oil Recovery" or EOR) techniques have been developed to recover additional oil from depleted wells. Such tertiary recovery techniques include thermal recovery, chemical injection, and gas injection. Using current methods, these tertiary techniques allow for an additional 20% or more of the oil to be recovered.

Gas injection is one of the most common EOR techniques. In particular, carbon dioxide ($CO_2$) injection into depleted oil wells has received considerable attention owing to its ability to mix with crude oil. Since the crude oil is miscible with $CO_2$, injection of $CO_2$ renders the oil substantially less viscous and more readily extractable.

Despite the potential advantages of $CO_2$ in enhanced recovery, its use has been hampered by several factors. For instance, in order for the enhanced recovery process to be economically viable, the $CO_2$ gas must be naturally available in copious supplies at reasonable cost at or near the site of the oil well. Alternatively, $CO_2$ can be produced from industrial applications such as natural gas processing, fertilizer, ethanol and hydrogen plants where naturally occurring $CO_2$ reservoirs are not available. The $CO_2$ must then be transported over large distances via pipeline and injected at the well site. Unfortunately, such $CO_2$ pipelines are difficult and costly to construct. Additionally, many oil sites are out of reach from such natural and industrial sources of $CO_2$.

Another gas that can potentially be used for enhanced recovery purposes is hydrogen. Hydrogen has received considerably less attention than $CO_2$, however. Hydrogen, although somewhat soluble with oil, is believed less so than $CO_2$. Moreover, traditionally, hydrogen has been costly to produce and its use has not been justified from an economic standpoint.

The rising cost of crude oil, as high as $60 to $70 per barrel in recent times, has increased interest in new enhanced oil recovery technologies. Simultaneously, the low cost of coal, often lower than $30 per ton, has made coal an attractive fuel source for EOR purposes.

Accordingly, as recognized by the present inventors, what are needed are a novel method, apparatus, and system for extracting oil/petroleum from the ground or from oil wells, such as depleted oil wells, by utilizing driver gases generated from a coal source. What are also needed are a method, apparatus, and system for extracting natural gas from the ground or from natural gas wells by utilizing driver gases generated from a coal source.

Therefore, it would be an advancement in the state of the art to provide an apparatus, system, and method for generating large quantities of carbon dioxide, hydrogen and other gases from coal or a derivative of coal at low cost at or near an oil site.

It is against this background that various embodiments of the present invention were developed.

BRIEF SUMMARY OF THE INVENTION

One embodiment of the present invention is a portable apparatus for generating a gas mixture from coal that may be used to drive currently unrecoverable oil from a near-depleted, or depleted, oil reservoir. An embodiment of the present invention is a portable, highly economic $CO_2$ generation system. This embodiment also generates large supplies of hydrogen. An embodiment of the present invention is a portable, modular system that may be delivered to the site of the oil well by various methods of transportation, including a truck, a boat, or an airplane. The scale of the present invention is simultaneously portable and also sized to generate sufficient driver gas for economic recovery of oil.

In one embodiment of the present invention, the portable apparatus generates $CO_2$ and hydrogen by a coal reforming reaction. The $CO_2$ is injected into the well while the hydrogen is split off from the $CO_2$ product to be used for other purposes, including electrical power generation or petrochemical processing. As will be discussed below, the hydrogen may also be injected simultaneously with the $CO_2$. Depending upon factors such as the particular composition of the underground oil, as well as the local cost of electrical power, an operator of the present invention may find it advantageous to use hydrogen in different proportions for these various purposes. Furthermore, if advantageous, the hydrogen may be injected by itself while the $CO_2$ is used for other purposes.

In light of the above and according to one embodiment of the present invention, disclosed herein is an oil recovery apparatus for extracting oil from an oil well ("the apparatus"). The apparatus includes a portable reformer for reacting a controlled amount of coal with a controlled amount of steam to generate driver gas, a compressor module for pressurizing the driver gas leaving the portable reformer, and an injection line, operatively connected to the compressor module, adapted to inject the driver gas into the oil well.

Another embodiment of the present invention is the apparatus described above that also includes a filter module for removing particles from the driver gas exiting the portable reformer.

Yet another embodiment of the present invention is the apparatus described above, where the driver gas includes hydrogen gas and carbon dioxide gas. The apparatus may also include a gas separator adapted to separate at least a portion of the hydrogen gas from the carbon dioxide gas.

Yet another embodiment of the present invention is the apparatus described above that also includes a heat recovery module, operatively connected to the portable reformer and the filter module. The apparatus may also include a steam generator, operatively connected to the heat recovery module for converting water into steam, where the steam generator is positioned adjacent to the portable reformer such that heat from the heat recovery module is used to convert water into the steam entering the portable reformer.

Yet another embodiment of the present invention is the apparatus described above that also includes a hopper adapted to feed coal directly into the portable reformer.

Yet another embodiment of the present invention is the apparatus described above, where the portable reformer is a fixed bed reformer.

Yet another embodiment of the present invention is the apparatus described above, where the portable reformer is a fluidized bed reformer. The apparatus may also include a cyclone fluidly connected to the fluidized bed reformer for removing ash from the driver gas exiting the fluidized bed reformer.

Yet another embodiment of the present invention is the apparatus described above, where the portable reformer is an entrained flow reformer.

Yet another embodiment of the present invention is the apparatus described above, where the coal and water is fed into the portable reformer as a liquid feed in the form of a coal/water slurry.

According to another embodiment of the present invention, disclosed herein is an apparatus for removing oil from an oil well. In one example, the apparatus may include a first storage container for storing a combustible material used in a combustion reaction; a second storage container for storing coal or coal derivative used in the reforming reaction; a third storage container for storing water to be reacted with the coal in the apparatus; a first chamber having an inlet and an outlet, the first chamber for combusting the combustible material with ambient oxygen for the release of energy, the inlet of the first chamber fluidly coupled with the first storage container; and a second chamber having an inlet and an outlet, the inlet of the second chamber fluidly coupled with the second and third storage containers, a portion of the second chamber positioned within a portion of the first chamber, the second chamber fluidly isolated from the first chamber. In one example, the energy released in the first chamber heats the coal and water sources used in the reforming reaction in the second chamber to a temperature above that necessary for the reforming reaction to proceed, thereby reforming the coal and water sources into driver gas exiting the outlet of the second chamber.

In one example, the first chamber includes an igniter for igniting the combustible material, and the second storage container may include a mixture of water with coal.

In another embodiment, the apparatus may include a first heat exchanger coupled with the outlet of the first chamber and thermodynamically coupled with the second chamber, the first heat exchanger for pre-heating the coal and/or water sources. The apparatus may also include a second heat exchanger coupled with the outlet of the second chamber and thermodynamically coupled with the inlet of the second chamber, the second heat exchanger for pre-heating the coal and/or water sources and for cooling the generated driver gas.

According to another embodiment of the present invention, disclosed herein is an autothermal apparatus for generating driver gas to remove oil from an oil well. In one example, the apparatus may include a single reaction chamber for combining coal, water, and an oxidizer; a coal delivery belt for delivery of coal; a pipeline for delivery of water; an oxidizing agent delivery pipe for delivery of oxygen or other oxidizing agent; and a driver gas outlet port for removal of driver gas produced in the reaction chamber. In one example, a counter-flow heat exchanger provides energy/heat from the released driver gas to the incoming water to facilitate the autothermal reformer reaction in the reaction chamber.

In one example of the autothermal reformer apparatus, a reaction chamber heater pre-heats the reaction chamber to initiate the coal reforming reaction and subsequent formation of driver gas.

According to yet another embodiment of the present invention, disclosed herein is a method for generating and using hydrogen and carbon dioxide rich gas mixtures from steam reforming of coal (or a derivative of coal); the gas mixtures can be used to drive oil from an oil well. In addition, and in accordance with another embodiment of the present invention, disclosed herein is a method for generating and using hydrogen and carbon dioxide gas mixtures from steam reforming of coal (or a derivative of coal), the gas mixtures used to drive trapped natural gas out of the ground.

Accordingly, disclosed herein is a method for removing oil from a near-depleted oil well ("the method"). The method includes the steps of providing a portable coal reformer at a site of the oil well, feeding a controlled amount of coal and a controlled amount of steam into the reformer, and reacting the coal and the steam in the reformer to generate a driver gas containing a mixture of hydrogen gas and carbon dioxide gas. Then, compressing the driver gas to a pressure appropriate for the oil well, and injecting the driver gas into the oil well. And, subsequently recovering the oil from the near-depleted oil well.

Another embodiment of the present invention is the method described above, that also includes the step of purifying the driver gas by filtering particles from the driver gas existing the portable reformer. The method may also include the step of recycling intermediate-sized particles back into the portable reformer.

Yet another embodiment of the present invention is the method described above, that also includes the step of adding a source of oxygen to the portable reformer, and reacting the oxygen with a combustible fuel source in the portable reformer. The combustible fuel source may also be coal.

Yet another embodiment of the present invention is the method described above, that also includes the step of removing sulfur from the driver gas exiting the portable reformer.

Yet another embodiment of the present invention is the method described above, that also includes the step of separating the driver gas into a hydrogen stream and a carbon dioxide stream prior to injecting the driver gas into the oil well. In the method described here, the carbon dioxide stream may be injected into the oil well and the hydrogen stream may be used to generate power.

In one example, the methods of the invention include reforming or reacting coal or a derivative of coal with water to generate hydrogen and carbon dioxide rich "driver gas" mixtures and injecting the driver gas into the oil well. The water may be introduced into the reforming reactor as liquid water or as steam.

The reforming reaction may be driven by the release of energy from a combustible or non-combustible source (such as electricity). In some embodiments, the energy is provided by a combustion reaction using a combustible material and atmospheric air. In a particular embodiment, the energy is provided by combusting coal with ambient air.

In some embodiments, the driver gas is a hydrogen-carbon dioxide rich gas mixture.

Other features, utilities and advantages of the various embodiments of the invention will be apparent from the following more particular description of embodiments of the invention as illustrated in the accompanying drawings.

DETAILED DESCRIPTION OF THE INVENTION

Figure 1:
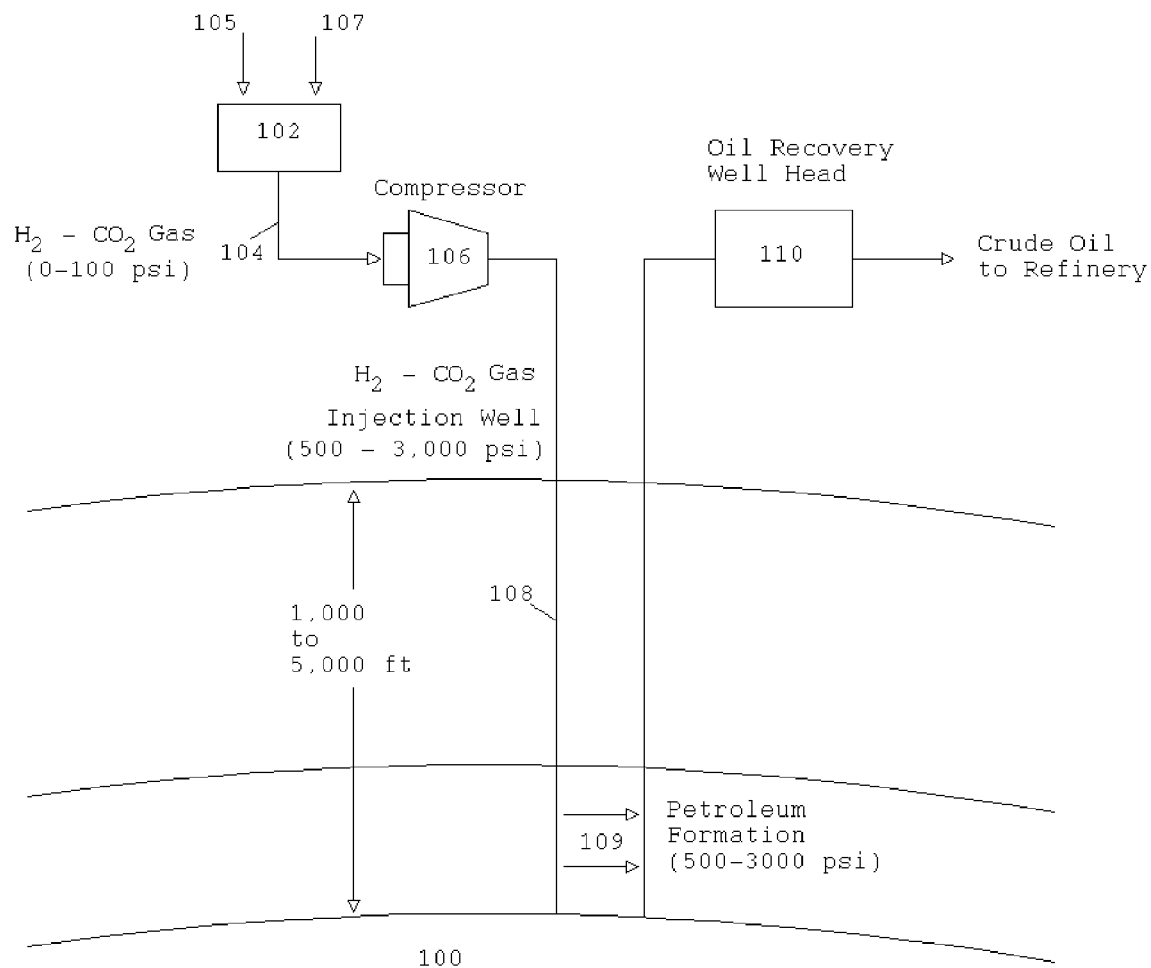
FIG. 1 illustrates an example of an embodiment of the present invention for the extraction of oil from an oil well.

Throughout this disclosure, the symbol "kcf" shall stand for "thousand standard cubic feet," usually of $CO_2$ unless explicitly stated otherwise. The symbol "MMcf" shall stand for "million standard cubic feet," usually of $CO_2$ unless explicitly stated otherwise. That is, a reformer that produces 1 kcf/day of driver gas produces 1,000 standard cubic feet of driver gas per day, while a reformer that produces 1 MMcf/day of driver gas produces 1,000,000 standard cubic feet of driver gas per day. The word "day" shall mean "a day of operations," which could be an 8-hour day, a 12-hour day, a 24-hour day, or some other amount of time, depending on how a particular oil field is being operated. Please note that other sources may use different symbols, such as "mcf" for "thousand cubic feet" based on the Roman numeral "M" for thousand, and care should be taken in terminology when consulting such sources.

Embodiments of the present invention provide for the generation of driver gas that is used for extracting oil from an otherwise depleted oil well, or to drive trapped reservoirs of underground natural gas to the surface. For purposes of the present invention, a driver gas is typically any gas formed during the reforming reactions of the present invention and is preferably a hydrogen-rich gas or hydrogen and carbon dioxide containing gas. Various embodiments of the present invention are disclosed herein. Note that the majority of the disclosure is directed toward creating a driver gas that is ultimately injected into depleted oil wells for the extraction of oil; however, methods and apparatus of the invention can also be used to create driver gases useful in driving trapped natural gas to the surface. As such, it is noted that the scope of the present invention encompasses the use of driver gas created in accordance with the present invention to drive out other materials beyond oil from depleted oil wells, and in particular encompasses using driver gas to drive trapped natural gas out of underground natural gas reservoirs.

In particular, carbon dioxide ($CO_2$) may be injected into depleted oil wells, rendering the oil substantially less viscous and more readily extractable. The $CO_2$ also pressurizes the oil, while the reduced viscosity mobilizes the oil for recovery through fluid drive.

In addition, hydrogen ($H_2$) may also be injected into depleted oil wells. There are various properties of hydrogen that suggest it would be highly useful in tertiary oil recovery if it can be economically produced at the site of the oil well. For instance, hydrogen has an extremely high rate of diffusion and is able to pervade the underground reservoir relatively quickly upon injection. Thus, the hydrogen will cause the oil to swell leading to a subsequent reduction in viscosity. At the same time, hydrogen will pressurize the well by creating an artificial gas cap. The resultant increased pressure renders the oil more amenable to withdrawal from the reservoir. Moreover, unlike water and heavier gases, hydrogen has the ability to invade tight junctions in a petroleum reservoir and thus, to provide a driving force for moving oil from such tight portions of a reservoir.

Another potentially significant advantage of using hydrogen in enhanced oil recovery is its ability to hydrogenate the oil in-situ. Hydrogenation of oil purifies the crude oil while at the same time reducing its viscosity, thus making the oil more prone to tertiary recovery and increasing its value. Generally, the hydrogenation reactions to purify recovered crude oil are carried out following oil recovery. Such processing steps are costly and potentially environmentally harmful. Accordingly, the in-situ hydrogenation of oil reservoirs has an environmental as well as an economic advantage.

In one embodiment of the present invention, pressurized hydrogen and $CO_2$ are injected simultaneously into the well. Carbon dioxide, when combined with hydrogen, will have a greater impact on enhanced oil recovery than $CO_2$ alone. Carbon dioxide, by virtue of dissolving in the crude oil, will decrease the viscosity of the oil, making it more amenable to recovery. Additionally, by permeating the small nooks and crevices in the bedrock, the hydrogen will have greater access to the oil and further reduce its viscosity. Thus, carbon dioxide and hydrogen will have a cooperative and mutually beneficial effect on the oil recovery process. However, it will be appreciated that this invention is not limited to this particular theory of operation.

It is another embodiment of the present invention to inject gases that are miscible in oil into an oil well in order to generate an artificial gas cap, thereby enhancing recovery of the oil. It is yet another embodiment of the present invention to inject a gas mixture composed of hydrogen and other gases so that the gas cap is a mixture composed substantially of hydrogen. It is yet another embodiment of the present invention to inject a gas mixture composed of carbon dioxide and other gases so that the gas cap is a mixture composed substantially of carbon dioxide. It is yet another embodiment of the present invention to inject a gas mixture composed substantially of hydrogen and carbon dioxide so that the gas cap is a mixture composed substantially of hydrogen and carbon dioxide. It is yet another embodiment of the present invention to capture the mixture of gases emerging from the oil well apart from the recovery of crude oil.

In FIG. 1, an underground oil well 100 (which may be otherwise depleted) is illustrated, having an amount of oil therein, such as a residual amount of oil 109. A portable, self-contained coal reformer 102 in accordance with the present invention generates driver gas (shown as arrow 104) that may be pumped into the oil well 100 for extracting the residual oil from the oil well 100. As explained herein, the coal reformer 102 may reform or react coal or derivatives of coal (shown as arrow 105) with water (shown as arrow 107) to form driver gas which, in one example, is a hydrogen and carbon dioxide gas mixture. The driver gas is then compressed by a compressor 106 into high pressure gas that could be pumped underground via injection line 108, where it could impose pressure on residual underground petroleum 109 sufficient to allow it to be extracted by a nearby oil recovery well head 110 or other like site. As an alternative to using coal, the reforming fuel source may also include alcohols, olefins, paraffins, ethers, aromatic hydrocarbons, carbonaceous urban trash, biomass, and other like materials (or mixtures thereof).

Figure 2:
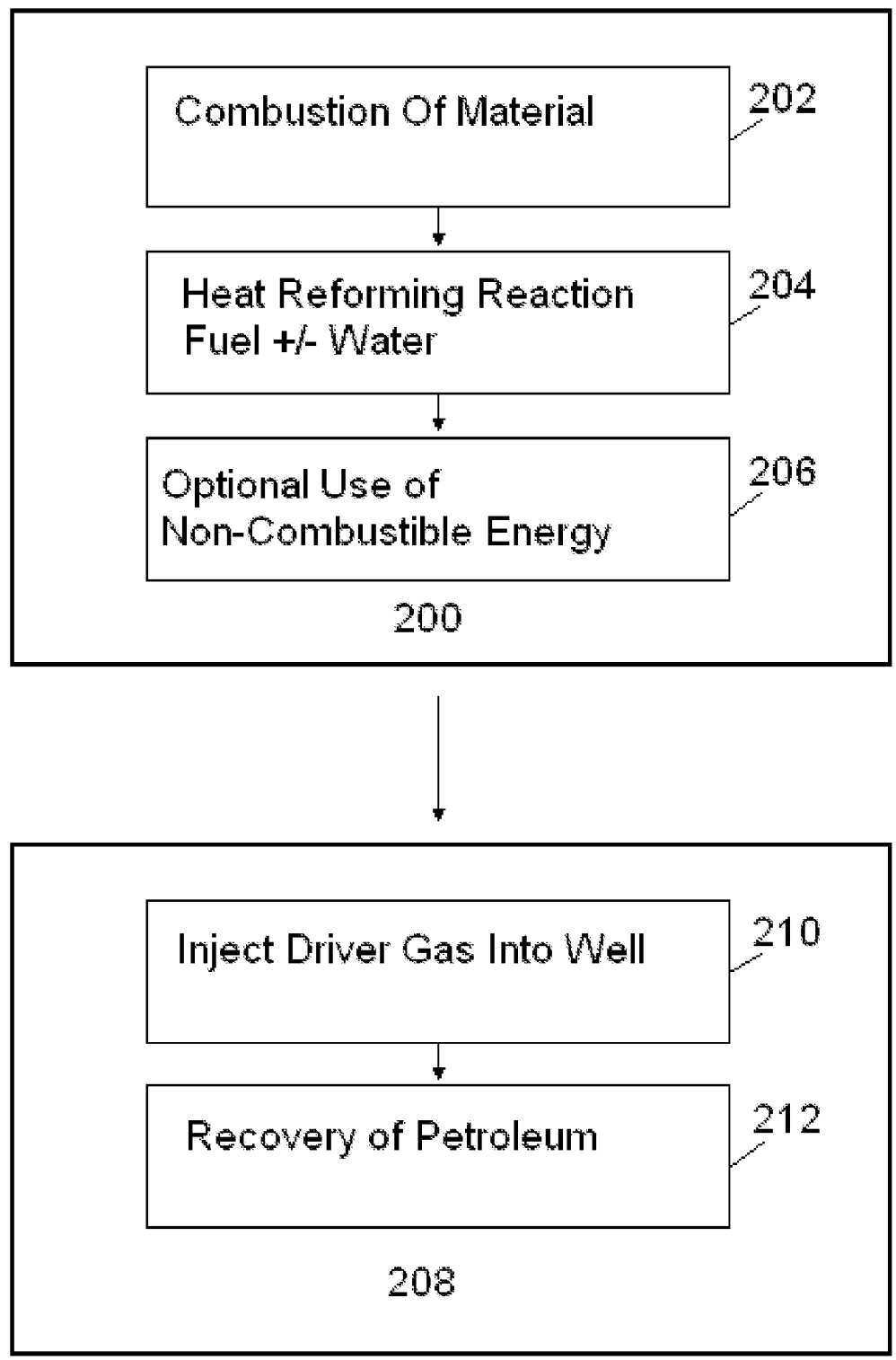
FIG. 2 illustrates an example of operations for extracting oil from an oil well, in accordance with an embodiment of the present invention.

FIG. 2 illustrates an example of operations that may be performed in order to drive petroleum resources out of the ground, such as out of an oil well or a depleted oil well. At operation 1 (shown as element 200), coal is reformed into driver gas. In one example, operation 1 may include combustion of coal 202, in order to provide energy, for instance, within a combustion chamber. The energy generated from the combustion may be used to heat the coal to a temperature where the coal reacts with water to form a hydrogen-rich driver gas 204. Note that the energy used to drive the reforming reaction can also be provided from burning a fuel other than coal, or from a non-combustible source, for example, solar energy, nuclear energy, wind energy, grid electricity, or hydroelectric power (shown as element 206).

At operation 2 (shown as element 208), the driver gas is injected into the oil well in order to drive petroleum out of the ground 210. For instance, the injected gas may soften highly viscous petroleum residues and displace them, thereby mobilizing such petroleum residues for recovery by conventional means (shown as element 212).

Embodiments of the present invention provide reformer apparatus for generating driver gas used in petroleum extraction, from among other sites, depleted oil wells. Apparatus embodiments of the invention are portable, self-contained, and energy efficient, and are able to generate driver gas through steam reforming of coal. In some embodiments, the apparatus utilizes a coal reforming reaction to generate the driver gas and a combustion reaction to provide the energy required to reform coal and generate the driver gas. Various apparatus embodiments are provided herein based on either separating the reforming reaction from the combustion reaction or based on combining the reforming reaction with the combustion reaction (referred to herein as "autothermal reforming"). In addition, the apparatus typically includes heat exchange elements to facilitate heat transfer from the high temperature driver gas to incoming reformer and/or combustion fuel. The transfer of heat facilitates the reforming reaction and lowers the energy required to complete the driver gas formation. Note that various apparatus configurations are envisioned to be within the scope of the present invention as long as the apparatus provides for on-site, portable, energy efficient coal reforming reactions (and preferably coal-steam reforming reactions) that produce driver gas useful in the extraction of petroleum products from an underground source. As such, one illustrative embodiment is described in relation to FIG. 3 for separate reformer and combustion reactions, followed by an embodiment described in relation to FIG. 4 for autothermal coal reforming and production of driver gas from a single reaction chamber.

The generated driver gases include hydrogen gas and carbon dioxide gas, and may also include other gases, such as nitrogen, carbon monoxide, etc. In one embodiment of the present invention, the hydrogen gas is separated, and used separately from the carbon dioxide. For example, the hydrogen gas may be burned in a gas turbine to generate electricity. Alternatively, the hydrogen gas may be mixed with the carbon dioxide, and used in conjunction with the carbon dioxide for enhanced oil recovery.

As used herein, the term "coal" includes any solid hydrocarbon, and derivatives thereof, including but not limited to lignite, sub-bituminous, bituminous, anthracite, peat, and the like. Derivatives of coal are also included within the term "coal," including, but not limited to, coal of all particulate sizes, crushed coal, pulverized coal, coal slurry (a mixture of coal and water), liquefied coal, etc.

A significant advantage of utilizing coal is the very low cost of coal in relation to liquid or gaseous fuels. Coal may be obtained at a typical cost of $30 per ton (approximately 3 cents per kilogram), and coal with high water content (which is advantageous in this application since water is a reactant) may be obtained at a significantly lower cost. The present invention may be especially advantageous in locations where coal is readily and/or cheaply available at or near the site of the oil well, as is often the case at many oil fields.

Reformer Apparatus

Figure 3:
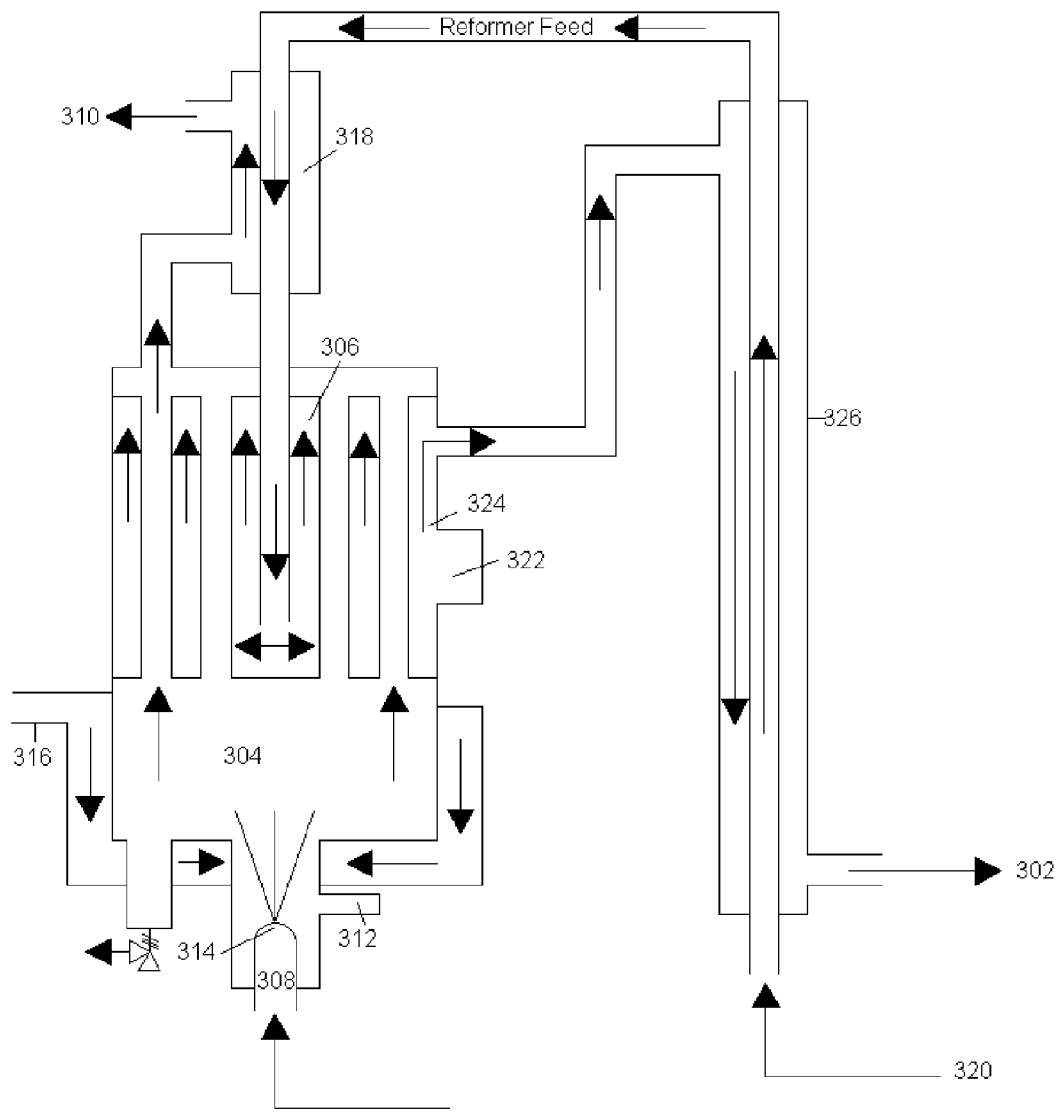
FIG. 3 illustrates an example of an indirect coal reformer for use with an apparatus for extracting oil from an oil well, in accordance with an embodiment of the present invention.

FIG. 3 illustrates an example of a self-contained, portable apparatus 300 for generating driver gas (shown as arrow 302) for injection into the ground or an oil well, in accordance with one embodiment of the present invention.

In FIG. 3, an embodiment of the apparatus may include a first storage container (not shown) for storing a combustible material, such as coal, an alcohol, olefin, or other like material. A second storage container (not shown) may also be provided for storing the coal fuel for the reforming reaction. The water may be mixed with the coal in this container to form coal slurry. Alternatively, a third container (not shown) may be used to store water to be reacted with the coal in the reformer chamber.

In one example, a first chamber 304 has an inlet port 316 and an outlet port 310 and is adapted to provide for the combustion of the combustible material. In one example, the first chamber 304 includes an igniter such as a spark plug 312 or other conventional igniter, and a nozzle 314 coupled with the inlet port 316 of the first chamber 304. The inlet port 316 of the first chamber 304 may be coupled with the first storage container (not shown) so that the contents of the first storage container may be introduced into and combusted within the first chamber 304. The first chamber 304 also includes a port 308 for introducing combustion air into the first chamber 304. The first chamber 304 is also adapted to receive a portion of the second chamber 306, described below, so that the energy/ heat from the combustion of the combustible material from the first storage container (not shown) within the first chamber 304 is transferred into a portion of the second chamber 306. The outlet port 310 of the first chamber 304, in one example, is near the inlet port 320 of the second chamber 306, and a heat exchanger 318 is used to allow the combustion exhaust gas to heat the coal and water entering the second chamber 306. Alternatively, the outlet 310 of the first chamber 306 can feed to a heat exchanger located inside the second chamber 306, which thereby allows the combustion exhaust gases produced in the first chamber 304 to provide the heat to drive the reforming reactions in the second chamber 306.

The second chamber 306 has an inlet port (shown as arrow 320) and an outlet port 302. In one example, the inlet port 320 is coupled with the second and third storage containers (not shown) and receives the contents of the second and third storage containers (not shown).

In one example, the second chamber 306 is positioned within the first chamber 304, such that the combustion heat/energy from the first chamber 304 heats the coal and water sources contained within the second chamber 306 to a point where the coal reforms into a driver gas which exists out of the outlet port 302 of the second chamber 306. The first and second chambers may be fluidly isolated.

In one embodiment, shown in FIG. 3, the reformer feed entering the inlet port 320 may be a single fluid, for example coal-water slurry. In other embodiments, not shown in FIG. 3, the coal and water may be fed into the reformer chamber through separate inlets.

In one example, a first heat exchanger 318 is coupled with the outlet port 310 of the first chamber 304 (the combustion chamber) and is thermodynamically coupled with a portion of the inlet port of the second chamber 306. In this manner, the hot combustion exhaust gases from the first chamber are used to preheat the coal and water sources as they are being introduced into the second chamber 306 for reformation into a driver gas.

A second heat exchanger 326 may also be utilized, wherein the second heat exchanger 326 is thermodynamically coupled with the outlet port 302 and the inlet port 320 of the second chamber 306, which provides the dual benefit of preheating the coal and water sources prior to entry into the second chamber 306, as well as cooling the driver gas which is expelled from the outlet port 302 of the second chamber 306.

Not withstanding the above examples, the present invention does not require the use of heat exchangers. The use of heat exchangers is optional. Heat exchangers may be used to increase the efficiency of the reformer apparatus. However, there may be situations in which heat exchangers would not be used, such as when hot driver gas is desired and/or when the coal and water sources are pre-heated.

Autothermal Apparatus

Figure 4:
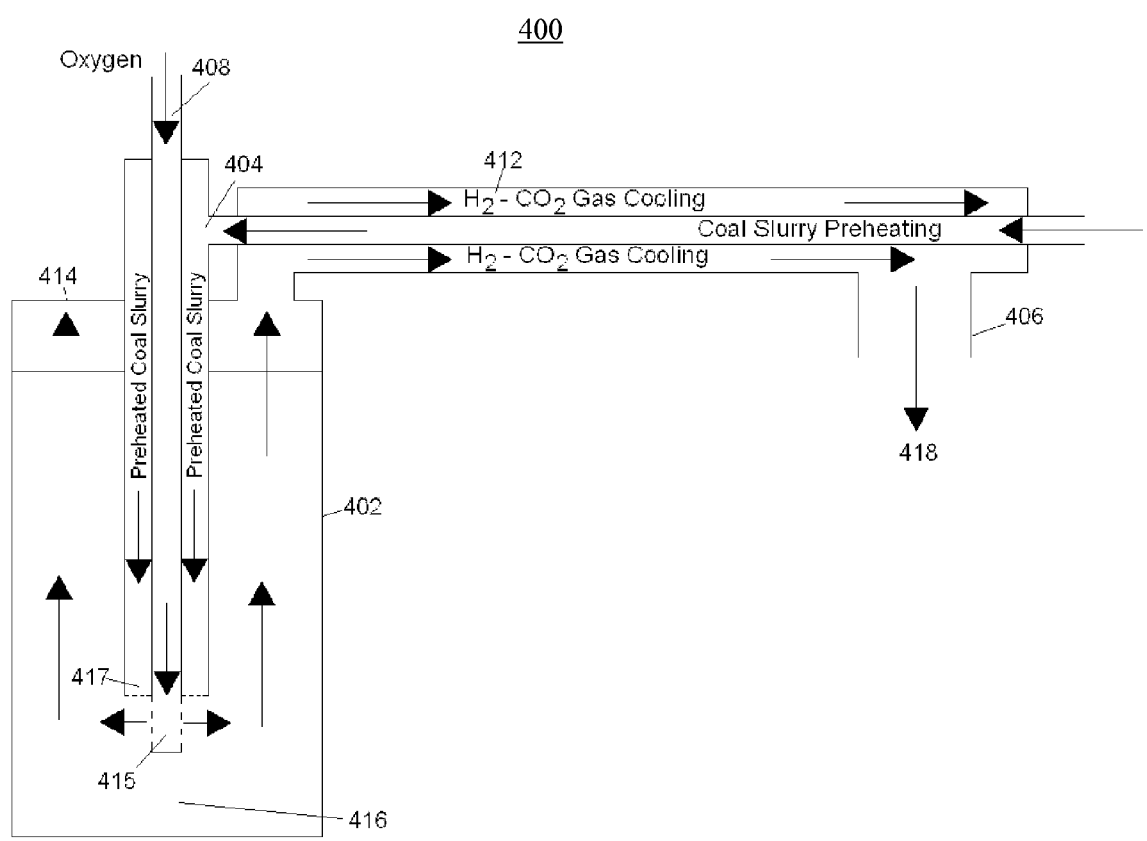
FIG. 4 illustrates an example of an autothermal coal reformer for use with an apparatus for extracting oil from an oil well, in accordance with an embodiment of the present invention.

FIG. 4 illustrates another example of a self-contained portable apparatus 400 for generating driver gas for injection into the ground or an oil well, in accordance with another embodiment of the present invention. The embodiment illustrated in FIG. 4 provides an "autothermal reformer" for the production of driver gas that is injected into the ground or an oil well (to remove oil or natural gas or other like materials).

An autothermal reformer 400 of the present invention directly reacts a coal source with water as well as oxygen, air, or other oxidizers in a single chamber 402. Embodiments of the reformer provide an environment for reforming coal from a feed at proper temperature and pressure resulting in the release of driver gas. Since the reforming reaction is favored by low pressure, in some embodiments, pressure in the autothermal reactor is maintained under 50 bar, and possibly under much lower pressure. Some embodiments of the autothermal reformer may combine counter-flow heat exchange elements to enhance heat transfer and energy efficiency of the autothermal reformer.

FIG. 4 shows one embodiment of the autothermal reformer apparatus 400 of the present invention. Note that other autothermal reformer apparatus are envisioned to be within the scope of the present invention as long as they provide at least a reaction chamber with a coal source inlet, a water or steam inlet (which may or may not be common with the coal inlet), an air or oxidizing agent inlet, and a driver gas outlet.

Referring to FIG. 4, an autothermal reformer apparatus 400 is shown having a reaction chamber 402, a coal-water slurry delivery pipe (fuel pipe) 404 for delivery of a mixture of coal and water, a driver gas outlet port (outlet port) 406 for release of produced driver gas 418, and an oxygen or other oxidizing gas inlet pipe (gas pipe) 408 for delivery of an oxidizing gas used in the combustion of the coal in the reaction chamber.

Still referring to FIG. 4, the reaction chamber 402 is of sufficient size and shape for autothermal reforming of coal. Different chamber geometries can be used as long as they constrain the autothermal reforming reactions and provide sufficient chamber space to produce an amount of driver gas necessary at an oil extraction site. In the embodiment shown in FIG. 4, the fuel pipe 404 is coupled to the outlet port 406 to form a counter-exchange heat exchanger 412 so that the energy/heat from the exiting driver gas is transferred to the coal-water slurry entering the reaction chamber 402 via the fuel pipe 404. In addition, the fuel pipe 404 typically enters at a first or top end 414 of the reaction chamber 402 and releases the fuel toward the second or bottom end 416 of the reaction chamber 402. This configuration enhances heat release from the heated coal-water slurry into the contents of the reaction chamber 402. Release of fuel into the reaction chamber 402 can be via an outlet 417 or other like device. The gas pipe 408 is typically coupled to or adjacent to the fuel pipe 404 and releases the oxygen or other oxidizing gas adjacent to the release of the coal-water slurry 415. Note that other configurations of coal and water delivery, oxygen or other oxidizing agent delivery, and driver gas release are envisioned to be within the scope of the present invention and are shown in FIG. 4 as an illustration of merely one embodiment. When in use, the reaction chamber of the autothermal reformer apparatus is typically preheated to a temperature sufficient to start the reforming reaction, i.e., approximately 500° C., and preferably above approximately 800° C. Preheating may be accomplished by a reaction chamber integrated heating element, a heating coil, an external combustor heating system, an internal combustion system, or other like device (not shown).

The coal and water sources are fed into the reaction chamber 402 via the fuel pipe 404. Note that once driver gas is produced in the reaction chamber 402, the coal-water slurry is heated prior to delivery into the reaction chamber 402 by the exiting driver gas (shown as arrow 418) via the counter-flow heat exchanger 412. At approximately the same time that the coal-water slurry is being delivered to the reaction chamber 402, the oxygen or other oxidizing agent is being delivered to the reaction chamber via the inlet pipe 408. Various reformer chemical reactions are described below.

Once the reforming reaction has been established within the reaction chamber 402, the reaction-chamber heating element may be shut off to conserve energy. Note also that the amount of water combined into the coal slurry can be adjusted to control the reforming temperatures.

While the example shown in FIG. 4 depicts coal and water being fed into the reactor together in the form of coal-water slurry, this is illustrative of only one embodiment. In other embodiments, shown in FIG. 5 and FIG. 6, coal and water may be fed into the reaction chamber through separate inlets. Also, in other embodiments, not shown, additional combustible material, such as natural gas, oil, or any other fuel may be fed into the reaction chamber (in addition to the coal) in order to facilitate initial system start-up or reactor temperature maintenance. The use of such additional fuel(s) may also be used to provide additional reforming reaction material or to change the hydrogen/carbon dioxide output ratio of the system. All such embodiments are envisioned to be within the scope of the present invention.

Chemical Processes

The generation of driver gas(es) will now be described, for example generating driver gas, i.e., a mixture of hydrogen ($H_2$), carbon dioxide ($CO_2$), and possibly other gases. The constituents of driver gas produced by embodiments of the present invention is determined by the reaction constituents and conditions as described below, but generally may include hydrogen gas, carbon dioxide gas, and mixtures thereof.

Embodiments of the present invention provide processes for producing driver gas from the reforming of coal or derivatives of coal. In alternative embodiments, other fuel sources, such as liquid and/or gaseous hydrocarbons, alcohols, olefins, paraffins, ethers, and other like materials may be used, either together with coal or as an alternative to coal. Examples of other fuel sources that may be used in the reforming reaction include, but are not limited to, methanol, ethanol, propane, propylene, toluene, octane, diesel, gasoline, crude oil, natural gas, or wood. A similar reformer apparatus may be used to reform these other fuels. Such alternative fuel sources may also be used in place of coal in the combustion reactions of the present invention in order to provide the heat necessary to drive the reforming reaction.

The driver gas may be generated by reforming any solid hydrocarbons (such as coal), which could be lignite, sub-bituminous, bituminous, anthracite, peat, and the like, with or without the addition of other fuels. The solid hydrocarbons may be used for the reforming reaction fuel, the combustion reaction fuel, or both. One advantage of utilizing solid hydrocarbons, such as coal, as the primary fuel feedstock is the relative low price of coal and other solid hydrocarbons as compared to many liquid and gaseous fuels.

The methods of the present invention are reproducible and easily performed in the portable inventive devices described herein. As a method of generating hydrogen, the processes of the present invention are superior to electrolytic hydrogen generation, which require large amounts of electrical power and are typically non-portable. The processes of the present invention are also superior to the production of hydrogen by cracking or pyrolysis of coal without the use of water because much more driver gas is produced for a given amount of coal consumed.

The methods of the present invention use easily obtained fuel sources such as coal, water, and atmospheric air.

In more detail, the present invention provides reforming processes of coal or coal-derivatives to generate, for example, $H_2$, $CO_2$, and other gases. The coal reforming reactions of the present invention are endothermic, requiring an input of energy to drive the reaction toward coal reformation.

In one embodiment, the energy required to drive the coal reforming reaction is provided through the combustion of any combustible material, for example coal, an alcohol, a refined petroleum product, crude petroleum, natural gas, or wood that provides the necessary heat to drive the endothermic steam reforming reaction.

In another embodiments, the energy required to drive the reforming reaction is provided via any non-combustible source sufficient to generate enough heat to drive the reforming reaction to substantial completion. Examples of non-combustible sources include solar, nuclear, wind, grid electricity, or hydroelectric power.

The present combination of reforming and combustion reactions may be performed within a portable reaction vessel, for example the devices described herein (see FIG. 3 and FIG. 4). This is in contrast to electrolytic hydrogen gas formation, which requires large amounts of electrical power and non-portable machinery for the generation of the driver gas.

The following reactions provide illustrative processes for reforming coal to produce driver gas used in the recovery of oil or other like materials. Several illustrative combustion reactions that provide the energy required to drive those reforming reactions are also provided. In one embodiment, shown as Reaction 1, a hydrogen and carbon dioxide rich driver gas is formed using coal and water sources. Note that the reforming reaction and combustion reaction can be performed in separate reaction chambers (see FIG. 3) or can be combined and performed in a single reaction chamber (see FIG. 4). The following reactions illustrate a separation of the reforming and combustion reactions, however, as shown in FIG. 4 and discussed in greater detail below, an autothermal reforming reaction may be accomplished by directly reacting the coal with oxygen in a single reaction chamber.

Separate chamber reactions (see FIG. 3): The reforming reaction for coal is shown in Reaction 1.

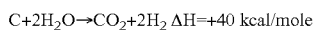
$C+2H_2O \rightarrow CO_2+2H_2$ $\Delta H=+40$ kcal/mole    Reaction 1:

Reaction 1 comes with an $\Delta H$ of +40 kcal/mole. This means that this same amount of energy should be contributed by the combustion reaction to drive the reaction toward the formation of $CO_2$ and $H_2$. Therefore, for a modest price in energy, coal may be reformed to form hydrogen and carbon dioxide gas.

Coal reforming takes place at high temperatures, and therefore a catalyst is generally not needed. In alternative embodiments, when a fuel other than coal is used, the reforming reaction may be performed in the presence of a catalyst, for example, when the reforming reaction fuel is methane combined with water, the feed is passed over a nickel or ruthenium based catalyst at temperatures above approximately 400° C. (although better results may be obtained at higher temperatures). That is, the reaction chamber in FIG. 4 could be prepared with a nickel catalyst when the reformer fuel is methane.

The energy used to drive the reforming reaction is provided by either combustible or non-combustible sources. In some embodiments of the present invention, the energy is provided by combustion of a portion of the coal source. In other embodiments, another combustible material, such as alcohol, petroleum, natural, wood, or other like material, is used.

The combustion of a fuel source supplies the energy to drive Reaction 1. An illustrative combustion reaction is shown in Reaction 2. The combustion of coal with ambient oxygen releases $\Delta H$ of −92 kcal/mole:

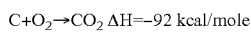
$C+O_2 \rightarrow CO_2$ $\Delta H=-92$ kcal/mole    Reaction 2:

Reaction 1 is endothermic, but is driven by the exothermic burning of coal as shown in Reaction 2. Accordingly, four units of Reaction 2 can drive nine units of Reaction 1, leaving:

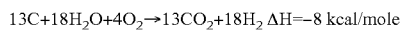
$13C+18H_2O+4O_2 \rightarrow 13CO_2+18H_2$ $\Delta H=-8$ kcal/mole    Reaction 3:

So, in the nearly energy-neutral Reaction (3), 156 kg of C produce 13 kmoles (10.6 kcf) of $CO_2$ and 18 kmoles (14.7 kcf) of hydrogen. Thus, theoretically (not being bound by any particular theory), for purposes of this illustration, only about 30% of the mass of coal is required to be burned to reform the rest of the coal via Reactions 1 and 2. It should also be noted, however, that while the burned coal provides no hydrogen, it does contribute carbon dioxide to the driver gas. This is a small price to pay given that the coal used in the reforming reaction is cheap, easy to store as a solid and readily available, even in remote areas of the world.

In general, the required energy to drive the coal reforming reaction may be furnished by burning modest fractions of the coal or by using an alternative fuel or other heating methods such as nuclear, solar or electric grid power. In each case, a much larger number of product molecules is produced than is burned or reacted, allowing a much larger amount of fuel to be driven out of the ground than must be used to obtain it. The driver gas consists of mixtures of hydrogen and carbon dioxide, neither of which will react with petroleum, and both of which can serve to reduce its viscosity and provide pressure to drive the petroleum from the ground.

With regard to autothermal reforming, coal is directly reacted with oxygen in the presence of water. In alternative embodiments, to facilitate combustion of all of the coal, oxygen gas, air, or other oxidizer materials, e.g., hydrogen peroxide, or nitrous oxide, is metered in an amount to react with all of the carbon contained in the coal. The thermodynamics of the autothermal chemical reactions with proper selection of operating temperature and pressure result in formation of substantially only carbon dioxide and hydrogen gas. However, in use, small amounts of water and other compounds may form by combustion of hydrogen or other byproduct reactions. Where air is used as the oxidizer, there will also be nitrogen left over which can serve as part of the driver gas.

As an alternative to using coal as the fuel source for the reforming reaction, various other fuels, such as alcohols, petroleum, natural gas, etc. may be used as the fuel source for the reforming reaction. Reactions 4-9 illustrate several other reforming reactions using alternative fuel sources that are also in accordance with the present invention.

$$C_2H_5OH+3H_2O \rightarrow 2CO_2+6H_2 \quad \text{Reaction 4 (ethanol):}$$

$$C_3H_8+6H_2O \rightarrow 3CO_2+10H_2 \quad \text{Reaction 5 (propane):}$$

$$C_3H_6+6H_2O \rightarrow 3CO_2+9H_2 \quad \text{Reaction 6 (propylene):}$$

$$C_7H_8+14H_2O \rightarrow 7CO_2+18H_2 \quad \text{Reaction 7 (toluene):}$$

$$C_8H_{18}+16H_2O \rightarrow 8CO_2+25H_2 \quad \text{Reaction 8 (octane):}$$

$$CH_4+2H_2O \rightarrow CO_2+4H_2 \quad \text{Reaction 9 (methane):}$$

Note that in general Reactions 1 and 4-9 (as well as other reforming reactions) result in large increases in the number of molecules of products compared to reactants, so all are benefited by being performed under low pressure. In alternative embodiments, olefins, paraffins, aromatics (as found in crude petroleum), or crude petroleum itself may be used as the reforming reaction fuel source.

Petroleum Extraction System

As shown by Reaction 1, coal and steam may be reformed to generate carbon dioxide and hydrogen driver gas. Coal molecules contain carbon and hydrogen with varying amounts of sulfur, nitrogen, and oxygen. Coal also contains variable amounts of moisture and inorganic mineral matter (a mixture of silicon, aluminum, calcium, magnesium iron, sodium, potassium, and other oxides plus iron sulfides). Thus, in order to utilize coal, some processing steps are needed to handle solid feeds and the presence of sulfur contaminants.

For utility power generation, coal is usually prepared and shipped as approximately 2-inch top-size product. However, many coal producers ship coal of other particle sizes for industrial boilers, metal casting, and other applications. For driver gas applications, coal of approximately 1-inch or smaller top size is preferable as feed to the coal reformers.

More specifically, the present invention provides for at least three possible coal-steam reformers, but is not limited to the three coal reformers described here. These include the fixed-bed reformer (FIG. 5), the fluidized-bed reformer (FIG. 6), and the entrained-flow reformer (not illustrated). The coal reformers increase in complexity in the order listed. The solids-residue handling requirements also increase in complexity in the same order. However, reaction rates also increase in the same order, leading to reduced equipment sizes for a given throughput. Each coal-steam reformer may be implemented as an indirect reformer configuration (as shown in FIG. 3), or as an autothermal reformer configuration (as shown in FIG. 4).

Table 1 shows important features that distinguish the three possible coal-steam reformers. Values are shown to illustrate relative differences in the reformer parameters.

TABLE 1

Operating parameters of various coal-steam reformers

| Operating Parameter | Fixed-Bed Reformer (FIG. 5) | Fluidized-Bed Reformer (FIG. 6) | Entrained-Flow Reformer (not illustrated) |
|---|---|---|---|
| Feed Particle Size | approx. <1" | approx. <¼" | approx. <0.1" |
| Temperature | approx. >700° C. | approx. >800° C. | approx. >1,200° C. |
| Solids Retention Time | greatest | intermediate | shortest |
| Gas Retention Time | longest | shorter | shortest |

All three coal-steam reformers operate at sufficient temperature to eliminate catalyst requirements for steam reforming. The fixed-bed and fluidized-bed reformers are able to accept coal of the delivered particle size. The entrained-flow reformer would require additional grinding or pulverizing of the coal after delivery to the oil site.

Figure 5:
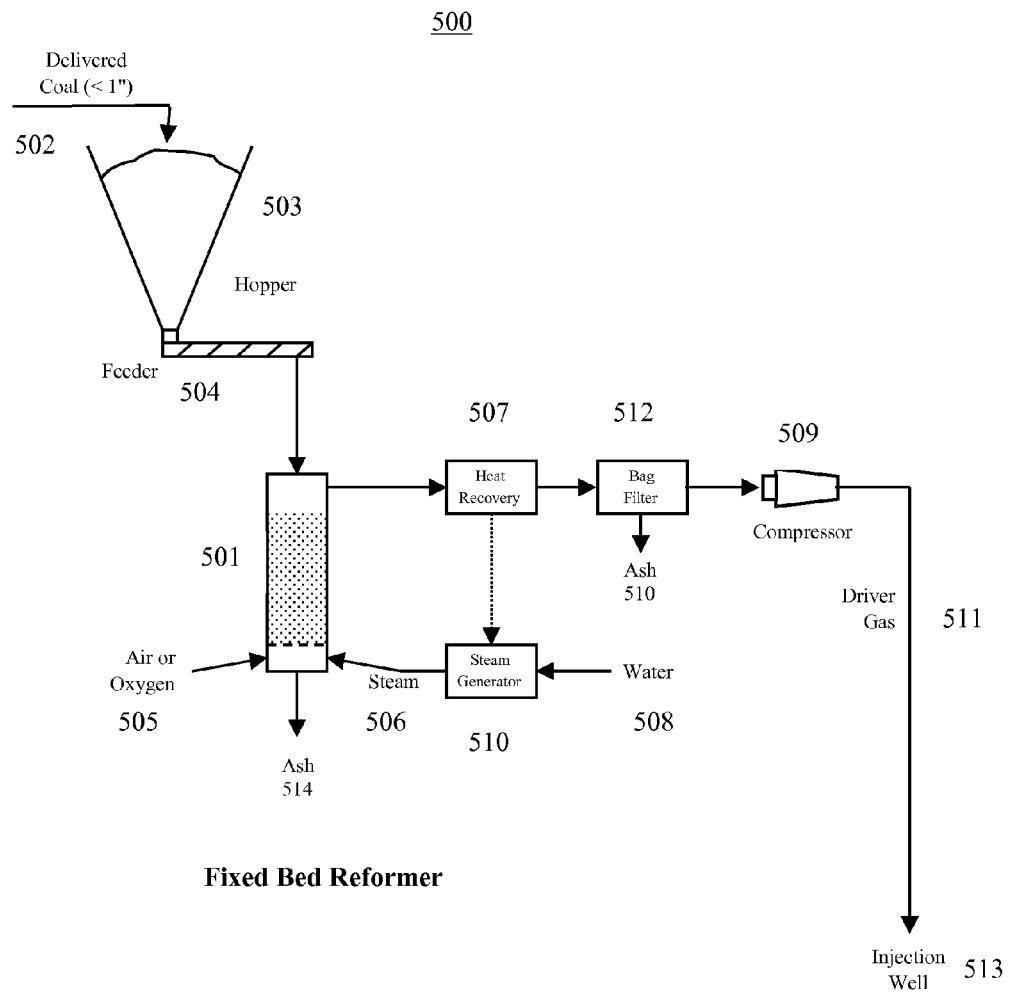
FIG. 5 illustrates an example of a fixed-bed coal-steam reformer for extracting oil from an oil well, in accordance with an embodiment of the present invention.

In one embodiment of the present invention 500, depicted in FIG. 5, a portable self-contained fixed-bed coal-steam reformer 501 is used to generate driver gas for injection into the ground of an oil well. In the reaction chamber of the fixed-bed reformer, nearly all the feed and residue particles remain in reaction chamber 501 during reforming. Delivered coal 502 with a feed particle size of approximately less than 1-inch is introduced into hopper 503. The coal 502 is then fed into fixed-bed reformer 501 through feeder 504. Combustion air or oxygen (shown as arrow 505) and steam (shown as arrow 506) are also fed into the fixed-bed reformer 501. In one embodiment, heat recovered from the reformer gas is directed into heat recovery unit 507. The heat can be sent to steam generator 510 to convert water (shown as arrow 508) into steam (shown as arrow 506). Alternatively, the heat can be used to generate electrical or mechanical power to drive compressor 509 or other hardware at the oil site.

The fixed-bed reformer can be fed and discharged in batch mode, semi-batch mode (incremental feeding and discharging of ash), or continuous mode. In the fixed-bed reformer, the inorganic matter (coarse ash) 514 remaining after steam reforming is largely handled in the form of coarser particles that can be removed from the bottom of the reactor. Smaller amounts of ash are entrained in the low velocity exhaust gas exiting the reformer. This fine ash 510 is removed through bag filter 512. Subsequently, the purified driver gas is pressurized in compressor 509 to generate pressurized driver gas (shown as arrow 511) that is injected into injection well 513.

Figure 6:
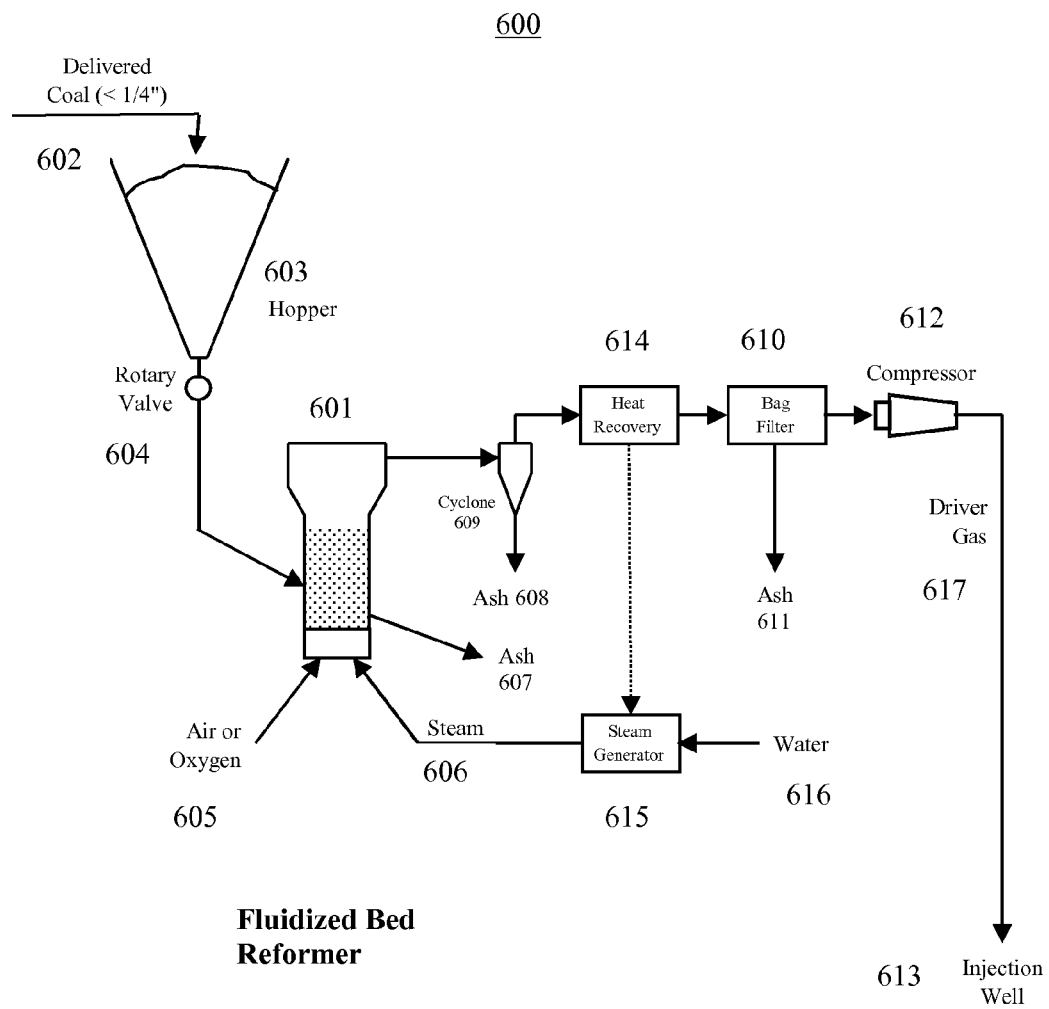
FIG. 6 illustrates an example of a fluidized-bed coal-steam reformer for extracting oil from an oil well, in accordance with an embodiment of the present invention.

In an alternative embodiment 600, depicted in FIG. 6, a portable fluidized-bed reformer 601 is used to generate driver gas for injection into the ground of an oil well. In the fluidized-bed reformer 601, most particles remain in the reaction chamber, but finer particles are entrained with the exhaust gas. That is, compared to the fixed-bed reformer 501 of FIG. 5, greater amounts of fine particles are entrained in the higher velocity exhaust gas (relative to the exhaust gas generated in the fixed-bed reformer) and must be removed prior to compression of the driver gas. The coarsest of the entrained particles are removed from the gas stream and can be recycled to the reformer or discharged as residue. The remaining finest particles are removed by filtration.

FIG. 6 illustrates an example of an embodiment of an oil recovery system utilizing the fluidized-bed reformer 601. Delivered coal 602 with a feed particle size of approximately less than ¼-inch is introduced into hopper 603. The coal is fed into fluidized-bed reformer 601 upon opening of the rotary valve 604. In the fluidized-bed reformer, combustion air or oxygen (shown as arrow 605) and steam (shown as arrow 606) are also fed into the reaction chamber. It is noted that in the fluidized-bed reformer 601, continuous feeding with semi-continuous discharge of coarser ash 607 is preferable. Intermediate ash 608 in exhaust gas exiting the fluidized-bed reformer 601 is removed by cyclone separator 609 (to remove intermediate-sized particles) and bag filter 610 (to remove the finest particles of ash 611) prior to pressurization of the driver gas 617 in compressor 612 and injection into injection well 613. The intermediate-sized particles separated by cyclone 609 can be recycled to the fluidized-bed reformer 601 or removed as residue, depending on the extent of their conversion during reforming. In one embodiment of the fluidized-bed reformer 601, exhaust gas existing cyclone 609 enters heat recovery unit 614. The heat can be sent to steam generator 615 to convert water (shown as arrow 616) into steam (shown as arrow 606). Alternatively, heat recovered from the reformer 601 can be used to generate mechanical power to drive compressor 612 or other hardware at the oil site.

In another embodiment of the present invention (not illustrated), a portable, entrained-flow reformer is used rather than a fixed-bed or fluidized-bed reformer. In an entrained-flow reformer, virtually all particles are removed with the exhaust gas steam exiting the reformer. The feed particle size using the entrained-flow reformer is generally less than approximately 0.1-inch. Compared to the fixed-bed and fluidized-bed reformers, the entrained-flow reformer would require additional grinding or pulverizing of the coal after delivery to the oil site. Furthermore, with the entrained-flow reformer, the entire feed stream is entrained and removed from the reaction chamber at high velocity. Cyclone and filtration hardware similar to those of the fluidized-bed reformer are used, but removal capacities must be greater.

In other embodiments of the present invention, (not illustrated in FIG. 5 or FIG. 6) a coal-water slurry may be used to provide both coal and water into the reformer in liquid form via a single feed system, as shown in FIG. 3 and FIG. 4.

In all coal-steam reformers described, the reformers operate at sufficient temperature to eliminate catalyst requirements for steam reforming. Generally, the fixed-bed reformer may operate at temperatures above approximately 700° C., while the fluidized-bed reformer may operate at temperatures above approximately 800° C. The entrained-flow reformer may operate at temperatures in excess of approximately 1,200° C. These temperature ranges are illustrative only, and are not intended to limit the scope of the present invention. All coal-steam reformers may operate over temperature ranges other than those temperature ranges disclosed here.

The fixed-bed reformer 501 of FIG. 5 and fluidized bed reformer 601 of FIG. 6 may be designed as illustrated in FIG. 3 or FIG. 4. That is, the steam reforming of coal can be carried out using an indirect reformer, as in FIG. 3, or a direct ("autothermal") reformer, as depicted in FIG. 4. Indirect reforming requires heat exchange between the heat source (coal combustion, for example) and the reformer. Driver gas produced from indirect steam reforming results in a greater hydrogen:carbon dioxide ratio than driver gas produced from direct ("autothermal") reforming. It will be appreciated that the combustible material may be coal, or alternatively may be an alcohol, olefin, natural gas, oil, or other combustible source.

Autothermal reforming eliminates the heat exchange requirement since partial combustion is performed in the reforming reaction chamber to generate heat. Using oxygen for the oxidizer, the autothermal reformer product gas is still a mixture of carbon dioxide and hydrogen, but the hydrogen:carbon dioxide ratio is lower than that for indirect reforming. Using air as the oxidizer, the autothermal reformer product gas is diluted with nitrogen. Both indirect and autothermal reforming using air or oxygen are valid methods for driver gas generation. Specifics of feed coal quality, capital costs, and driver gas requirements will lead to the optimum selection for each enhanced oil recovery application.

Illustrative coal reformers have been described and shown here. However, the present invention is not limited to these coal reformer configurations, and other coal reformers are within the scope of the present invention.

Sulfur Removal

Because steam reforming of coal is performed without catalyst, reforming catalyst poisoning by sulfur compounds is not an issue. In cases where a low-sulfur coal feed is used, sulfur clean up of the exhaust gas may not be required at all. In the event of potential issues with corrosion caused by sulfur-containing gases in combination with any residual moisture, several sulfur treatment and removal methods are possible.

Dry sorbents may be used to capture sulfur in the exhaust gas. Calcium oxide, magnesium oxide, and sodium carbonate are example dry sorbents that are capable of trapping sulfur gases in solid form (as sulfates or sulfites, depending on the relative oxidation conditions). When the operating temperature and pressure permit effective sulfur capture, sorbent can be added in a coarse form with the coal feed to fixed- or fluidized-bed reformer configurations. The resulting sulfur-containing product can then be removed from the reaction chamber with the ash remaining after reforming. Alternatively, a finer sorbent can be injected into the gas down stream of the reactor. Sulfur containing solids can then be collected in the cyclone or bag filter. For the entrained-flow reformer configuration, a sorbent will likely perform better by injection into partially cooled gas down stream of the reformer.

In large-capacity reformer configurations, a dry sorbent may be injected in a separate unit down stream of the final ash particulate filter. The sulfur product can then be collected separately in another filter and can potentially be sold as a product for additional revenue.

In other embodiments, sulfur may also be removed by using a wet scrubber sub-system. Wet scrubbers can be configured in venturi, packed-column, or tray-type systems in which the cooled gases are contacted with a scrubbing solution or slurry. The resulting scrubber solution or slurry must then be disposed.

Hydrogen-Carbon Dioxide Gas Separation

According to the present invention, a portable, highly economic $CO_2$ and $H_2$ generation system is created which enables enhanced oil recovery to be conducted wherever the candidate oil field may be. The $CO_2$ and $H_2$ are generated from coal, a highly economical fuel source and one that is often readily available at or near typical oil sites. The $CO_2$ generated in the present invention may be injected into an oil well for enhanced oil recovery. The present invention also generates large supplies of hydrogen, which may be used to enhance underground oil recovery in a similar fashion to $CO_2$ (as described above), or alternatively split off from the $CO_2$ product to be used for other purposes, including electrical power generation or petrochemical hydrogenation. Depending upon factors such as the particular composition of the underground oil, as well as the local cost of electrical power, the user of the present invention may find it advantageous to use the hydrogen in different proportions for these various purposes.

Hydrogen gas may be mixed with the carbon dioxide gas and injected into the oil well. Alternatively, the hydrogen may be separated from the carbon dioxide. The hydrogen gas may be injected into the oil well, followed by injection of the carbon dioxide gas. Alternatively, the carbon dioxide gas may be injected first, followed by injection of the hydrogen gas.

In an alternative embodiment, the hydrogen gas may be sold to the petrochemical, or other industry. In the future, it may also be sold as a fuel for hydrogen-electric cars. Alternatively, the hydrogen may be burned, using for example a gas turbine, to generate electricity. The electricity may be used to provide power for various operations of the oil site. Alternatively, the electricity may be sold to utility companies by feeding the electricity into the electric grid.

Various techniques may be used to separate hydrogen gas from carbon dioxide gas. In one embodiment, hydrogen-carbon dioxide separation may be performed using membranes. The membranes separate molecules based on their relative permeability through various materials that may include polymers, metals, and metal oxides. The membranes are fed at elevated pressure. The permeate is collected at lower pressure while the retentate is collected at a pressure close to the feed pressure.

A membrane separation technique that may operate in conjunction with reactions at elevated temperature is the palladium membrane. This membrane, which may be fabricated using palladium alone or in combination with modifiers, allows only hydrogen to permeate. This type of membrane when operated in a catalytic reactor, such as in a steam reformer, enhances yield by removing a reaction product from the reaction zone. Some variants are capable of operation at up to 900° C.

Another membrane separation method that may be used is a high-temperature polymer membrane. This type of membrane is directed toward $CO_2$ separation and recovery. A polymeric-metal membrane of this type can operate at up to 370° C. (versus typical maximum polymer membrane temperatures of about 150° C.), thus potentially improving process energy efficiency by eliminating a pre-cooling step.

In another embodiment, pressure swing adsorption (PSA) may be used for hydrogen-carbon dioxide gas separation. PSA separates carbon dioxide by adsorption onto molecular sieves or hydrotalcite at elevated pressure. Hydrogen does not absorb and is therefore collected at high concentration at the outlet. A PSA system contains at least two sorbent columns so that while one is in absorption mode, the other is in desorption mode. Reducing pressure and/or heating desorbs the carbon dioxide collected on the column. The PSA techniques are designed to produce nearly pure hydrogen while collecting $CO_2$, CO, $CH_4$, and other gases in a separate stream.

In yet another embodiment, carbon dioxide may be separated from hydrogen by scrubbing in an amine solution. This technique may be used to remove carbon dioxide (and hydrogen sulfide) from the driver gas and may also be used for $CO_2$ recovery from flue gas from the combustion reaction.

Finally, in yet another embodiment, regenerable sorbents may be used to separate hydrogen gas from carbon dioxide gas. In one example of a low-cost regenerable sorption method, a sodium carbonate sorbent is used. The sodium carbonate sorbent operates cyclically, by absorbing at about 60° C. and regenerating at about 120° C.

Electrical Power Generation

The present invention may also be configured as a modular system, which may include all or part of the following set of components: a chassis, a fuel reformer, a gas separator, a compressor, heat exchangers, a power generator, a control system, and a gas capture sub-system. These components may be mixed and matched depending on the particular application, the requirements of a particular user, or the conditions of a particular oil field. These components are described in detail throughout this disclosure, and in particular in greater detail below.

A chassis for supporting the sub-systems is provided. The chassis may be attached to an appropriate method of transportation, such as a truck, boat, or aircraft. The chassis, carrying the various modules, may be mounted or carried upon any number of different vehicles. The chassis may have one or more wheels, or it may have no wheels and may instead rely on the wheels of the vehicle. This configuration makes the system highly portable, and allows it to be easily transported to the location of any oil well, including off shore and remote wells.

A coal reformer module, capable of reacting coal with water to produce a mixture of $CO_2$ and hydrogen gas, sized to an output rate appropriate for enhanced oil recovery operations, is provided. Depending upon the availability and cost of local coal types, the reformer may be designed to operate with various candidate coal feed stocks, including Western coal, which has a large water-content. The coal reformer may be designed as a fixed-bed reformer, a fluidized-bed reformer, an entrained-flow reformer, or another design altogether. The coal reformer may be designed in a direct reforming configuration, or an indirect ("autothermal") reforming configuration. Examples of the design of such coal reformers are discussed above.

A set of heat exchangers, designed to maximize the thermal efficiency of the reformer system, are provided. The heat exchangers were discussed above in relation with the fuel reformers of FIGS. 3 and 4.

A gas separator module, capable of separating the $CO_2$ from the hydrogen gas, is provided. This module gives an operator of the present invention a choice of how much hydrogen to send underground with the $CO_2$, and how much to retain for surface utilization. Candidate separator systems include sorption beds, $CO_2$ freezers, membranes, and centrifugal separators, as described above.

A compressor module, capable of compressing the driver gas to a pressure appropriate for oil recovery, is provided. The compressor is capable of sending the $CO_2$ as well as a portion of the hydrogen intended for underground use, deep into the well for use in oil extraction. The compressor may be effectively explosion proof. This can be accomplished by using an explosion-proof pump, or alternatively by housing a pump that is not rated explosion-proof within a container that provides an inert environment.

Various types of compressors may be used to compress the driver gas before injection into the oil well. In one embodiment, a compressor may be used that operates using electric motors to provide the proper rotation speed and power input. In other embodiments, air-driven motors may be used. In yet other embodiments, a direct mechanical linkage to the power generator may be provided, as described below.

In some embodiments, compressors for $CO_2$ and/or $H_2$ are based on lubricated or non-lubricated rotary, centrifugal, or reciprocating designs. These systems typically use seals around rotary or reciprocating shafts. In other embodiments, a compressor for driver gas may be based on a metal diaphragm design. In these embodiments, the compressor is designed so that no lubricant or coolant comes in contact with the driver gas. Only the metal diaphragm and elastomer seals contact the driver gas.

A power generator module, capable of utilizing the hydrogen product separated by the gas separated to generate electricity, is provided. The power generator may be a gas turbine, an internal combustion engine, a fuel cell system, or any other apparatus or system that can generate power (electrical or mechanical or other) from hydrogen gas. On-site power generation may be used to support driver gas production processes as well as driver gas compression and injection. In some driver gas production scenarios, an excess of power is available and could be fed through the electrical power grid to generate additional revenue.

The power generator module may be a combustion turbine, a steam turbine, or a combination of the two. In a combustion turbine, hydrogen is fed with air to generate power through a rotating shaft. In a steam turbine, a variety of fuels may be used, including a portion of the hydrogen separated from the carbon dioxide, part of the coal or other feedstock material, or even waste hydrocarbon gases. The fuel is burned in air in a combustion chamber to generate heat. The heat is transferred to a closed-loop steam/water system through a series of heat exchangers designed to recover the combustion heat. The high-pressure steam drives a turbine for power generation. The combustion turbine and steam turbine may be integrated to boost efficiency. The combustion and steam turbine shafts are conventionally connected to generators to produce electrical power. However, they may be used to produce mechanical power from the turbine shaft (for direct drive of the gas compressor, for example, see above).

A control module, capable of controlling the operation of the system both automatically and with user-input, is provided. The control module may use subsurface data to automatically regulate the operation of the system via feedback control. This allows the system to operate with minimal human supervision or labor. The subsurface data may include total pressure, partial pressure of carbon dioxide, partial pressure of hydrogen, temperature, and/or viscosity of the oil. The control module may also include a set of controls for user-control of the system.

A gas capture module, capable of re-capturing a portion of the driver gas and recycling the driver gas, is provided. The gas capture module allows the $CO_2$ and hydrogen that is released with the oil emerging from the ground to be re-captured and sent via the compressor module underground for reuse. The gas capture module increases the overall efficiency of the oil recovery operation, because a portion of the generated driver gas is recycled and reused.

The above components may be mixed and matched by the user of the present invention in appropriate combinations based on local conditions and market prices. For example, if the oil site has a high power requirement, or the local cost of electricity is high, the $H_2$ gas may be separated from the $CO_2$ using a gas separator as described above, and the $H_2$ may be burned in a gas turbine to generate electricity. The electricity may be either used onsite to provide power for the oil field, or else sold to an electric distribution company by feeding the electricity into the electric grid. Therefore, a portable and modular system is created for enhancing oil recovery wherever a candidate oil field may be.

Figure 7:
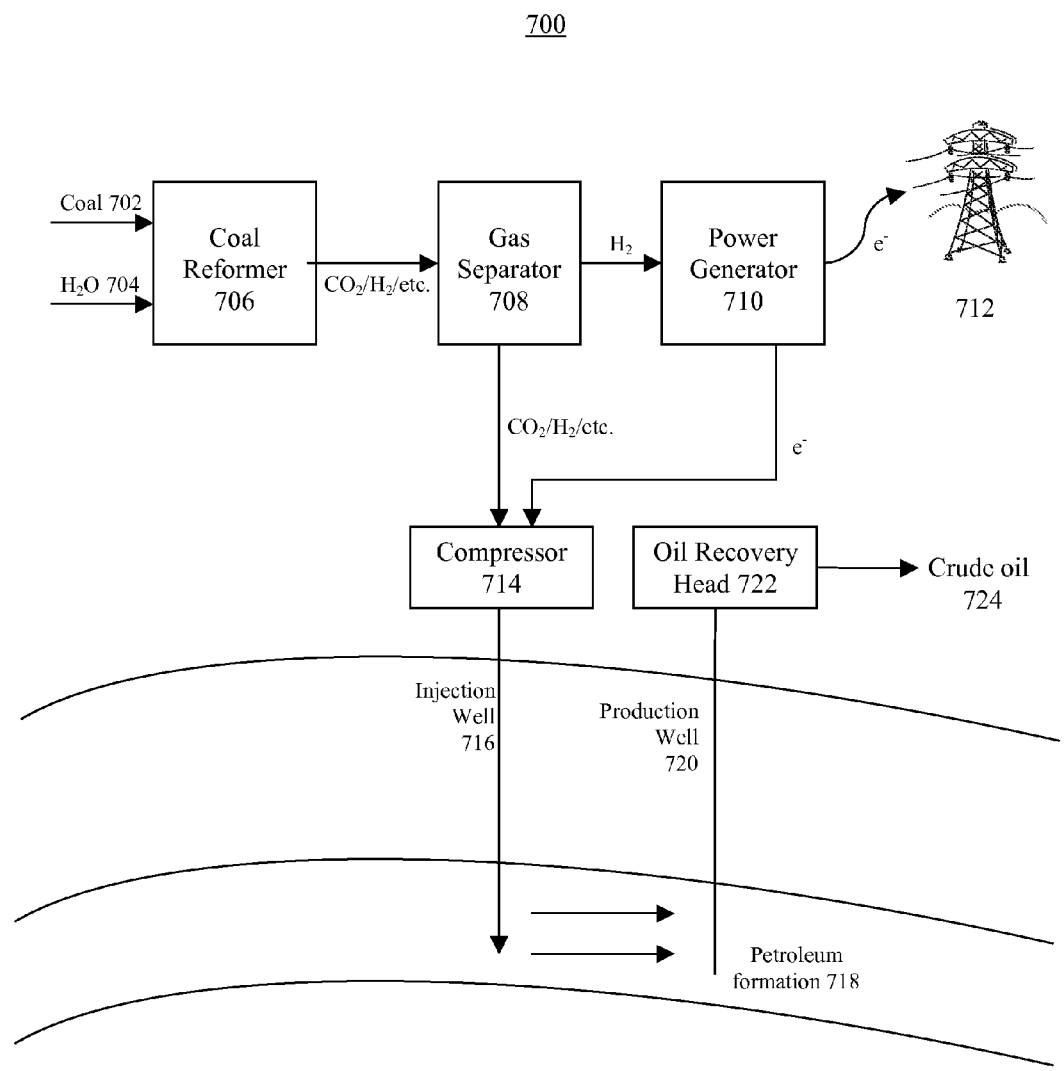
FIG. 7 illustrates an example of an embodiment of the present invention for the extraction of oil from an oil well and for the generation of electricity.

FIG. 7 illustrates one example of an embodiment 700 of the present invention for extracting oil from an oil well and for generating electricity. This example is illustrative only, and is not intended to limit the scope of the present invention. Processed, desulfurized coal 702 and water 704 are fed into coal reformer 706. The coal and water may also be fed pre-mixed as coal-water slurry. Generated driver gas, which may include $CO_2$, $H_2$, as well as other gases, are fed into gas separator 708, which separates a portion of the hydrogen gas from the other driver gases. A portion of the separated hydrogen gas is fed into power generator 710, which could be a gas turbine, to generate electricity. A portion of the electricity is fed into the electric grid 712. A portion of the electricity is used on-site, to provide power to various modules, such as the compressor 714.

The rest of the driver gas is compressed by compressor 714 for injection into injection well 716. The driver gases, including the carbon dioxide as well as potentially a portion of the hydrogen gas, and potentially other gases (such as $N_2$), pressurize the underground petroleum formation 718 and reduce its viscosity. The crude oil 724 is more amenable to recovery by oil recovery head 722 via production well 720, or other like site.

Figure 8:
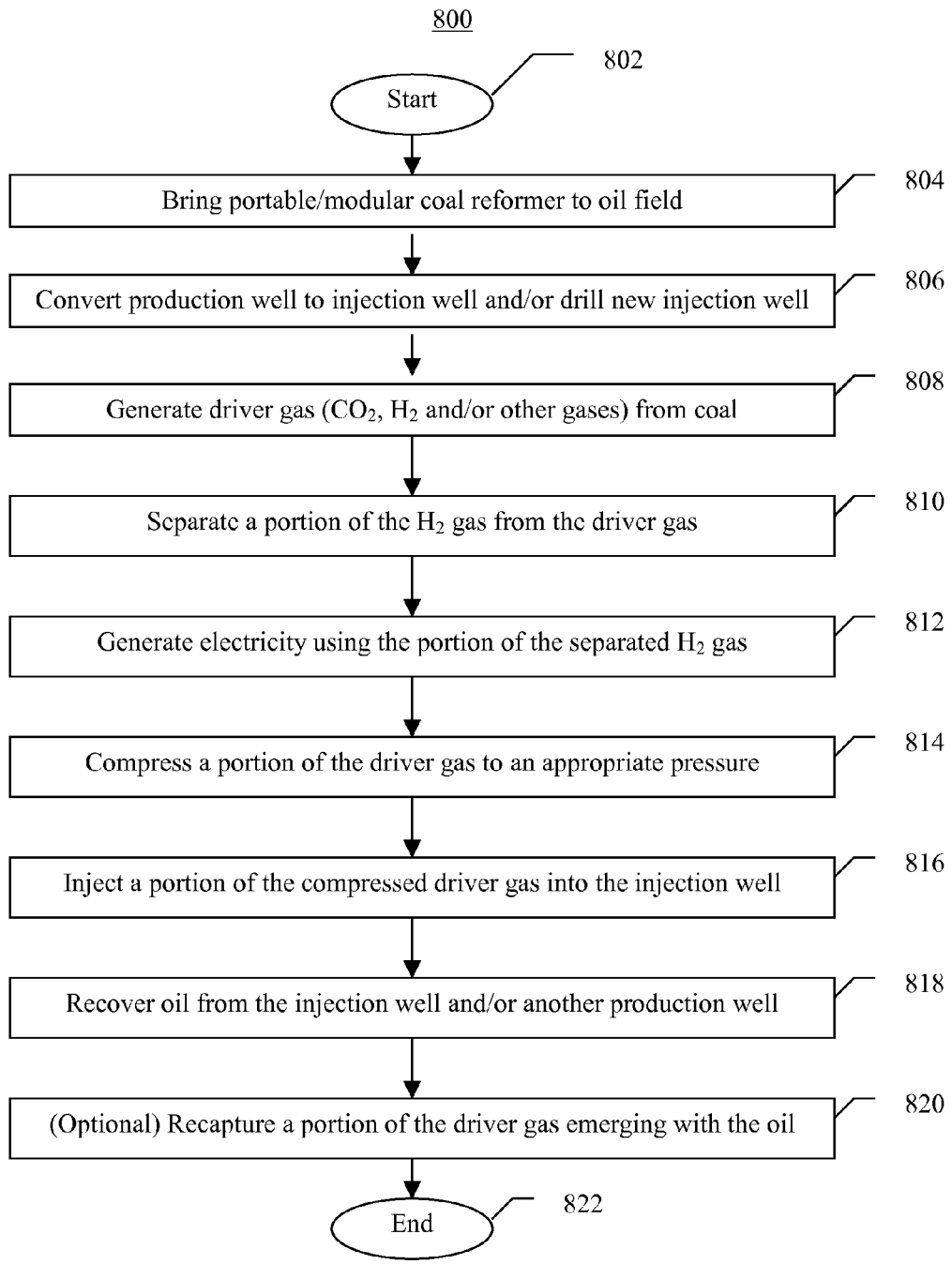
FIG. 8 illustrates an example of operations for extracting oil from an oil well and generating electricity, in accordance with an embodiment of the present invention.

FIG. 8 illustrates an example of operations for extracting oil from an oil well and generating electricity, in accordance with the embodiment of FIG. 7. Process 800 begins in step 802. A portable/modular coal reformer according to the present invention is brought to an oil field, as shown in step 804. An existing production well is converted to an injection well and/or a new injection well is drilled, as shown in step 806. Driver gas, comprising $CO_2$, $H_2$, and/or other gases is generated from coal or a derivative of coal using the portable coal reformer, as shown in step 808. A portion of the $H_2$ gas is separated from the rest of the driver gas, as shown in step 810. Using a portion of the separated $H_2$ gas, electricity is generated, as shown in step 812. The electricity may be used locally and/or fed into the electric grid for additional revenue. A portion of the driver gas intended for underground use is compressed to an appropriate pressure, as shown in step 814. A portion of the compressed driver gas is injected into the injection well, as shown in step 816. Oil is recovered from the same injection well ("Huff-and-Puff") and/or another production well, as shown in step 818. Optionally, a portion of the driver gas emerging with the oil from the oil well is re-captured for reuse underground, as shown in step 820. The process 800 ends at step 822.

Therefore, according to one embodiment of the present invention, electricity is generated from coal without emitting any carbon dioxide into the atmosphere. In countries and states that impose tax penalties on $CO_2$ emissions, this environmental benefit may contribute to a significant economic benefit as well.

This is but one system configuration that is possible utilizing the modular components of the present invention, and the present invention is not limited to this particular configuration. For example, an operator who does not wish to generate electricity, and/or an operator who wishes to use all of the hydrogen gas along with the carbon dioxide gas for enhanced oil recovery, would not use a gas separator or power generator module, but would still use a coal reformer and a compressor.

As another example, an operator who wishes to operate a hydrogenation plant near the oil well may chose to use a gas separator module to separate the hydrogen, but may chose not to use a power generator module. Such an operator would still use the other modules, and would feed the separated hydrogen gas to the hydrogenation plant.

Scale of Operations

The scale of the present invention is simultaneously portable and also sized to generate sufficient driver gas for economic recovery of oil. For example, consider a near-depleted oil well that presently generates 1 barrel of oil per day. Established industry guidelines estimate 1 additional barrel of oil recovered for every 5,000 to 10,000 standard cubic feet (5-10 kcf) of $CO_2$ injected into a near-depleted oil well. (A value of 10 kcf of $CO_2$ per barrel of oil recovered will be used hereafter as a conservative estimate.) Therefore, in order to bring the capacity of the near-depleted oil well up from 1 Ba/day to 100 Ba/day, the present invention should be sized to generate approximately 1,000,000 standard cubic feet (1,000 kcf) of $CO_2$ per day. That is, in one embodiment of the present invention used for enhanced oil recovery in an oil field producing 100 barrels per day, an embodiment of the present invention should be sized to produce an output of $CO_2$ gas on the order of one million cubic feet per day (1 MMcf/day).

However, the present invention is by no means limited to an apparatus that produces $CO_2$ at a rate of 1 MMcf/day. For example, if an oil well is expected to produce 10 Ba/day, an embodiment of the present invention may be sized to produce an amount of $CO_2$ equal to approximately 100,000 standard cubic feet (100 kcf) per day. Alternatively, if an oil field is expected to produce 1,000 Ba/day, an embodiment of the present invention may be sized to produce an amount of $CO_2$ equal to approximately 10 million standard cubic feet (10 MMcf) per day. Since the volume of the reaction chamber, and hence the volume of $CO_2$ produced, grows as the cube of the linear dimension of the reaction chamber, an apparatus that produces 10 times the amount of $CO_2$ would have a linear footprint increase of approximately 2.2 (cube-root of 10). That is, an apparatus sized to produce 10 MMcf/day of $CO_2$ would only be sized about two times larger in each linear dimension (or four times the footprint area) than an apparatus designed to produce 1 MMcf/day of $CO_2$.

Alternatively, an operator of an oil field may chose to utilize two or more smaller reformer modules in place of a larger reformer module. For example, consider an operator of an oil field described above producing 100 Ba/day. Such an operator needs approximately 1 million cubic feet of $CO_2$ per day (1 MMcf/day). Instead of utilizing one large reformer module, an operator may chose to utilize four (4) smaller reformer modules, each sized to produce 250,000 cubic feet of $CO_2$ per day (250 kcf/day). One potential advantage of utilizing four smaller reformer modules instead of one large reformer module is the ability to space the four reformer modules easily around a single well. Another potential advantage of utilizing multiple smaller reformer modules over a large reformer module is the greater flexibility in transportation of the smaller modules. Finally, another potential advantage of utilizing multiple smaller reformer modules is the standardization and economies of scale that are possible in manufacturing a unit of standardized size which is replicated for larger operations.

Therefore, based on the above analysis, it is apparent that an apparatus according to the present invention may be produced/manufactured for any appropriate oil well and/or oil field size at only a small incremental increase in production/manufacturing cost. Therefore, the present invention is a highly economical, highly portable, and highly modular apparatus that may be customized to an oil well and/or oil field of any size.

As shown below, the amount of hydrogen produced by reforming sufficient coal to produce 1 MMcf/day of carbon dioxide driver gas is also sufficient to produce about 2 Megawatts (MW) of electric power. This is a convenient size to feed meaningful amounts of electricity into an electric power grid to support growth of demand faced by power companies in a modular fashion, without the need for massive investment in new, large-scale (~1000 MW) facilities. Thus, the mass production and deployment of the present invention could be potentially very attractive to utility companies, allowing them to meet their customer's demand for increased supply, without the risk of major investments in large facilities, while receiving their power from a constant, regularly-available, carbon-emission-free source. This is in contrast to supplementing utility power with wind turbines, solar cells, and the like, whose power, while also carbon-emissions-free, is only available on an intermittent, irregular basis.

Various alternative sizes may be attractive. Therefore, the present invention may be sized appropriately, and any mention of particular sizes in this description is illustratively of but a few particular embodiments of the present invention, and is not meant to limit the scope of the present application to any particular size described.

Economics of Driver Gas Production

As discussed in greater detail throughout the present disclosure, the reforming of coal is provided for production of driver gas used in the extraction of oil from the ground or from an oil well. In one embodiment, the generated driver gas, e.g., hydrogen-rich gas, is used for recovering materials from currently economically non-viable resources, including extracting oil trapped in depleted wells, liquefying oil shale, and forcing out methane trapped in coal beds. Currently there are tens of thousands of depleted oil wells all over the world, which collectively possess billions of barrels of petroleum resources that cannot conventionally be extracted by economic means.

The driver gas of the present invention is injected into the ground, where it softens highly viscous petroleum residues and displaces and mobilizes them for economic recovery.

These uses compare with the use of stored compressed gases as driver gas at an oil well recovery site. However, such gases are normally transported at very high pressures (2,200 psi) and in very heavy gas bottles (e.g., K-bottles, weighing approximately 55 kg each with, for example, only 0.6 kg of hydrogen). Using easily transported coal to perform Reactions 1 and 2 allows the production of a high hydrogen and carbon dioxide concentration driver gas. In this sense, gas generation for use in the field provides a significant cost benefit over conventional methods for providing driver gas.

The following example is provided by way of illustration and is not intended as limiting. An oil recovery estimate of a typical embodiment of the present invention is provided herein.

The processes of the present invention produce significant quantities of $CO_2$. While the yield from $CO_2$ Enhanced Oil Recovery (EOR) techniques varies depending upon the reservoir in question, it is generally taken in the industry that where conditions are appropriate for the technique, yields of about 1 barrel of oil per 5,000 to 10,000 standard cubic feet (5-10 kcf) of gaseous $CO_2$ can be expected. (For a conservative estimate, the following discussion will assume 1 barrel of oil per 10 kcf $CO_2$.) For this reason, $CO_2$ EOR is generally viewed as a viable method to use under conditions where $CO_2$ can be obtained at a cost of $2/kcf or less (i.e., the cost of $CO_2$ is less than approximately $20/bbl of oil recovered.) Unfortunately, currently $CO_2$ supplies are only available at such costs if the oil field in question is situated a comparatively short distance from either natural $CO_2$ reservoirs or large scale artificial $CO_2$ sources such as coal-fired power plants, ethanol plants, or steel mills. This situation leaves most oil fields that could otherwise be good candidates for $CO_2$ EOR stranded out of reach of effective economic recovery.

As recognized by the present inventors, the present invention is a modular, highly portable apparatus/system that may be taken wherever an oil site may be located. Therefore, the present invention provides $CO_2$ at an economic cost at the oil site. As an example demonstrating the potential economic utility of the present invention, consider the case of a unit according to the present invention whose owner-operator decides to use the entire $CO_2$ product for EOR, while directing all of the hydrogen for power generation. In this example, the owner-operator uses coal as in reforming Reaction 1 and 2 at an oil field where coal is readily and cheaply available, as is often the case at oil sites.

In the nearly energy-neutral Reaction (3), 156 kg of C produce 13 kmoles (10.6 kcf) of $CO_2$ and 18 kmoles (14.7 kcf) of hydrogen.

A typical price for coal is $30/tonne, or $0.03/kg. At this price, the 156 kg of C would cost about $4.68. But since this is producing 10.6 kcf of $CO_2$, the cost in feedstock per kcf of $CO_2$ produced is $0.44/kcf, well below the approximately $2/kcf industry benchmark for economic $CO_2$-EOR.

However, in addition, the apparatus according to the present invention also generates 18 kmoles (14.7 kcf) of hydrogen. The hydrogen may be used with the carbon dioxide in enhanced oil recovery as described in greater detail above. Alternatively, the hydrogen gas may be separated, and used separately from the carbon dioxide gas and burned in, for example, a gas turbine, to generate electricity.

Assuming the hydrogen gas is burned in a gas turbine to produce electricity in accordance with Reaction 10:

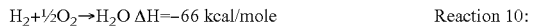

$$H_2 + \tfrac{1}{2}O_2 \rightarrow H_2O \quad \Delta H = -66 \text{ kcal/mole} \qquad \text{Reaction 10:}$$

Reaction 1 produces 18 kmoles of hydrogen, which translates to 1,188,000 kcal=4,989,600 kJ=1386 kWh of energy. Assuming a thermal-to-electrical conversion efficiency of 33%, this equals 462 kWh of energy. At a typical electricity price of $0.10/kWh, this amount of energy is worth $46.20. (kWh=kilowatts per hour, a standard unit of energy used by utility companies.)

Therefore, by using the present invention, an operator transformed $4.68 worth of coal into $46.20 worth of electricity plus an amount of $CO_2$ worth $21.20 at the standard EOR acceptable rate of $2/kcf, and which can be used to recover 1.06 barrels of oil, worth $63.60 at a typical expected oil price of $60/bbl. Taken together, the value of the electricity together with that of the recovered oil amounts to $109.80, or about 23.5 times the $4.68 worth of coal consumed in the process.

It should be noted that this is a worst-case scenario for the operation of the present invention, because by being burned for electricity, the 18 kmoles of hydrogen yield a lower monetary return than the 13 kmoles of $CO_2$. If the hydrogen can be used with equal effectiveness as $CO_2$ as a means of driving oil out of the ground, instead of producing $46.20 worth of electricity, the hydrogen would yield $88.06 worth of oil, for a total return of $151.66, or 32.4 times the value of the coal consumed.

Of course, the operator of the present invention will have other costs besides coal, including capital equipment, labor, taxes, insurance, etc., but as shown by the analysis below, provided these and other normal business matters are handled effectively, the potential for profit from such a system could be quite large.

Profit would be enhanced further if some of the $CO_2$ and/or $H_2$ used to recover oil can be recaptured and recycled after the oil is brought to the surface. Effective use of such techniques would make many fuels much more expensive than coal highly attractive for utilization in the present invention. It will be appreciated that in the above example, power is being produced without the emission of any $CO_2$ into the atmosphere. As a result of widespread concern over global warming, proposals are being considered to create taxes on $CO_2$ emissions, with typical figures mentioned in the range of $50/tonne $CO_2$ released. This is equivalent to a tax on coal use of $14/tonne, roughly 47% of the cost of typical coal. The present invention would allow coal to be burned to produce power without incurring such penalties.

Considering the figures from the above example, if 156 kg/day of coal produce 10.6 kcf of $CO_2$ and 14.7 kcf of hydrogen, then 14,716 kg of coal per day will be needed to supply 1 MMcf of $CO_2$, as well as 1.39 MMcf of hydrogen (MMcf=million cubic feet).

Assuming an oil yield of 1 barrel/10 kcf of $CO_2$, such an operation could be expected to recover 100 barrels/day, for a cash value at $60/bbl of $6,000. The hydrogen will yield 43,585 kWh of electricity, for a total sales value at $0.10/kWh of $4,358/day, and an output power level of 1,816 kW. At $30/tonne, the cost of the coal to feed the apparatus of the present invention will be just $441/day. (kW=kilowatt; kWh=kilowatts per hour.)

Thus the total gross income generated by a system according to the present invention would be $10,358/day, or about $3.8 million per year. Coal costs will be about $160,000 per year. Assuming a payroll of $400,000/year for a five-man operating crew, plus $200,000 per year to make interest and principal payments on a total plant and equipment valued at $2 million, plus another $240,000 per year to cover other costs, a total overhead budget of $1 million/year is obtained. Therefore, net profit from system operations according to the principles of the present invention would be about $2.8 million/year.

This economic analysis illustrates that driver gases generated by the present invention may be profitably used to extract oil from underground or underwater sources, such as depleted oil wells, while also producing further profit through the production of electricity without net carbon dioxide emissions. This economic analysis is illustrative only, and is not intended to limit the scope of the present invention. Various economic parameters, assumptions, and conditions will affect the economic analysis in various ways. However, the present invention is intended to operate under all such economic conditions.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the spirit and scope of the present invention.

What is claimed is:

1. A portable oil recovery apparatus for substantially rejuvenating a near-depleted oil well, comprising:
    a portable coal reformer adapted to steam reform a quantity of coal with a quantity of water to generate driver gas comprising hydrogen gas, carbon dioxide gas, and carbon monoxide gas, wherein sufficient water is provided to ensure a substantial majority of the coal is converted directly into carbon dioxide gas and hydrogen gas in a single step;
    a gas separator module having a hydrogen outlet and a carbon dioxide outlet, operatively coupled to the portable coal reformer and adapted to separate at least a portion of the carbon dioxide gas from the driver gas;
    a power generator module having a hydrogen inlet operatively coupled to the hydrogen outlet of the gas separator module, and adapted to generate electric power using the hydrogen gas received from the gas separator module via the hydrogen inlet;
    a compressor module having a carbon dioxide inlet operatively connected to the carbon dioxide outlet of the gas separator module and adapted to compress the carbon dioxide gas separated by the gas separator module to a pressure appropriate for the near-depleted oil well; and
    a carbon dioxide output on the compressor module adapted to eject the compressed carbon dioxide gas out of the portable apparatus and into the near-depleted oil well.

2. The apparatus of claim 1, wherein a substantial portion of the carbon dioxide gas is injected into the near-depleted oil well, thereby allowing oil to be recovered from the near-depleted oil well while generating electricity with low carbon dioxide emissions.

3. The apparatus of claim 1, further comprising:
    a filter module, operatively coupled to the portable coal reformer and positioned between the portable coal reformer and the gas separator module, and adapted to remove particles from the driver gas produced by the portable coal reformer before the driver gas is separated by the gas separator module.

4. The apparatus of claim 1, further comprising:
    a heat recovery module operatively connected to the portable coal reformer and adapted to recover a portion of heat released by the portable coal reformer.

5. The apparatus of claim 1, further comprising:
    a steam generator module adapted to convert water into steam, wherein the steam generator module is positioned adjacent to the power generator module such that heat from the power generator module is used to convert water into steam entering the portable coal reformer.

6. The apparatus of claim 1, further comprising:
    a hopper operatively connected to an inlet on the portable coal reformer and adapted to feed the coal into the portable coal reformer.

7. The apparatus of claim 1, wherein the coal and the water are mixed to create coal-water slurry that is fed via an inlet to the portable coal reformer.

8. The apparatus of claim 1, wherein the portable coal reformer is a fixed bed reformer.

9. The apparatus of claim 1, further comprising:
    a reaction chamber for reacting a quantity of oxygen with a combustible material, wherein energy released from combustion of the oxygen and the combustible material in the reaction chamber is used to heat the portable coal reformer in order to reform the coal and the water in the portable coal reformer into the driver gas.

10. A method for substantially rejuvenating a near-depleted oil well, comprising:
    providing a portable coal reformer at a site of the near-depleted oil well;
    feeding a quantity of coal and a quantity of water into the portable coal reformer;
    steam reforming the coal and the water in the portable coal reformer to generate a driver gas comprising a mixture of hydrogen gas, carbon dioxide gas, and carbon monoxide gas, wherein sufficient water is provided to ensure a substantial majority of the coal is converted directly into carbon dioxide gas and hydrogen gas in a single step;
    separating the driver gas into a substantially carbon dioxide gas stream and a substantially hydrogen gas stream;
    generating power using the hydrogen gas stream;
    compressing the carbon dioxide gas stream to a pressure appropriate for the near-depleted oil well;
    injecting the compressed carbon dioxide gas stream into the near-depleted oil well; and
    recovering oil from the near-depleted oil well, thereby rejuvenating the near-depleted oil well.

11. The method of claim 10, wherein a substantial portion of the carbon dioxide gas is injected into the near-depleted oil well, thereby allowing oil to be recovered from the near-depleted oil well while generating electricity with low carbon dioxide emissions.

12. The method of claim 10, further comprising:
    purifying the driver gas by filtering particles from the driver gas exiting the portable coal reformer.

13. The method of claim 12, further comprising:
    recycling intermediate-sized particles into the portable coal reformer.

14. The method of claim 10, further comprising:
    adding a quantity of oxygen to the portable coal reformer;
    reacting the oxygen with a combustible material in the portable coal reformer; and
    reforming the coal and the water in the portable coal reformer utilizing energy released from combustion of the oxygen and the combustible material.

15. The method of claim 10, further comprising:
    reacting a quantity of oxygen with a combustible material in a separate reaction chamber; and
    reforming the coal and the water in the portable coal reformer utilizing energy released from combustion of the oxygen and the combustible material in the separate reaction chamber.

16. The method of claim 15, wherein the combustible material is coal or a derivative of coal.

17. The method of claim 10, further comprising:
    removing sulfur from the driver gas exiting the portable coal reformer.

18. The method of claim 10, further comprising:
    converting water into steam by recycling heat released by the hot driver gas exiting the portable coal reformer.

19. The method of claim 10, further comprising:
    converting water into steam by utilizing heat released from the power generation step before feeding the steam into the portable coal reformer.

20. A portable apparatus for substantially rejuvenating a near-depleted oil well, comprising:
    transportation means for transporting the portable apparatus to the near-depleted oil well;
    reformation means for reforming a quantity of coal with a quantity of water to generate driver gas, the driver gas comprising hydrogen gas, carbon dioxide gas, and carbon monoxide gas, wherein sufficient water is provided to ensure a substantial majority of the coal is converted directly into carbon dioxide gas and hydrogen gas in a single step;

separation means for separating a portion of the carbon dioxide gas from the driver gas, the separation means operatively connected to the reformation means;

power generation means for generating power using the hydrogen gas, the generation means operatively coupled to the separation means;

pressurization means for pressurizing the carbon dioxide gas to a pressure appropriate for injection into the near-depleted oil well, the pressurization means operatively connected to the separation means; and injection means for injecting the pressurized carbon dioxide gas into the near-depleted oil well, the injection means operatively coupled to the pressurization means, wherein the transportation means supports and transports the reformation means, the separation means, the power generation means, the pressurization means, and the injection means.

21. The apparatus of claim 20, wherein a substantial portion of the carbon dioxide gas is injected into the near-depleted oil well, thereby allowing oil to be recovered from the near-depleted oil well while generating electricity with low carbon dioxide emissions.

22. The apparatus of claim 20, further comprising:

steam generation means for converting water into steam, wherein the steam generation means is positioned adjacent to the power generation means such that heat from the power generation means is used to convert water into steam entering the reformation means.

* * * * *